(12) United States Patent  (10) Patent No.: US 8,311,799 B2
Liu  (45) Date of Patent: Nov. 13, 2012

(54) EXAMPLE-BASED TRANSLATION USING COMMON AND UNCOMMON PORTIONS OF AN INPUT SENTENCE

(75) Inventor: Shaoming Liu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 873 days.

(21) Appl. No.: 12/130,406

(22) Filed: May 30, 2008

(65) Prior Publication Data

US 2009/0132235 A1 May 21, 2009

(30) Foreign Application Priority Data

Nov. 20, 2007 (JP) ................................. 2007-301051

(51) Int. Cl.
*G06F 17/28* (2006.01)
(52) U.S. Cl. .......................... 704/4; 704/2; 704/5; 704/7
(58) Field of Classification Search .......................... None
See application file for complete search history.

(56) References Cited

U.S. PATENT DOCUMENTS

| | | | |
|---|---|---|---|
| 6,804,637 B1* | 10/2004 | Tokuda et al. .................... | 704/2 |
| 6,862,566 B2* | 3/2005 | Wakita et al. .................... | 704/2 |
| 7,194,403 B2* | 3/2007 | Okura et al. ..................... | 704/7 |
| 7,593,843 B2* | 9/2009 | Aue et al. ......................... | 704/2 |
| 2003/0154068 A1* | 8/2003 | Tokuda et al. .................... | 704/7 |
| 2005/0267734 A1* | 12/2005 | Masuyama ....................... | 704/2 |
| 2006/0095248 A1* | 5/2006 | Menezes et al. .................. | 704/3 |

FOREIGN PATENT DOCUMENTS

| | | |
|---|---|---|
| JP | 6-083864 A | 3/1994 |
| JP | 8-087506 A | 4/1996 |
| JP | 2005-107597 A | 4/2005 |

* cited by examiner

*Primary Examiner* — Jesse Pullias
(74) *Attorney, Agent, or Firm* — Sughrue Mion, PLLC

(57) ABSTRACT

A translation device includes: a memory that stores character strings forming an example sentence pattern under which example sentences are classified based on character strings that form sentences, and character strings forming a translated example sentence pattern translated from the example sentence pattern, the character strings forming the example sentence pattern being associated with the character strings forming the translated example sentence pattern based on the meanings of the character strings; a converting unit that converts an input sentence into a sentence including common portions corresponding to common character strings shared by the example sentences, and uncommon portions; and a translating unit that translates the input sentence, based on a mapping that illustrates associations with the character strings forming the translated example sentence pattern stored in the memory and associated with the uncommon character strings corresponding to the uncommon character strings of the converted sentence.

13 Claims, 26 Drawing Sheets

FIG. 5

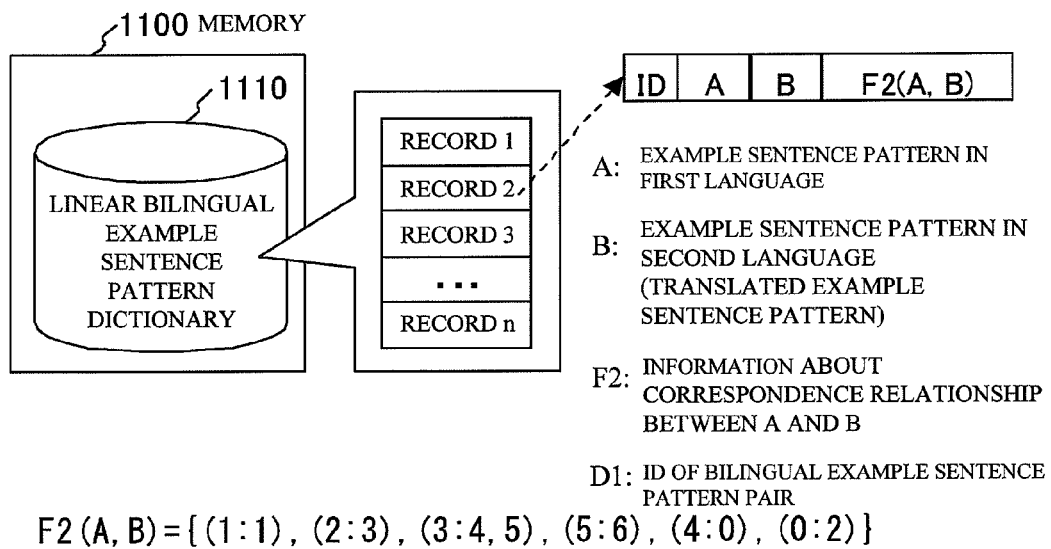

A: EXAMPLE SENTENCE PATTERN IN FIRST LANGUAGE

B: EXAMPLE SENTENCE PATTERN IN SECOND LANGUAGE (TRANSLATED EXAMPLE SENTENCE PATTERN)

F2: INFORMATION ABOUT CORRESPONDENCE RELATIONSHIP BETWEEN A AND B

D1: ID OF BILINGUAL EXAMPLE SENTENCE PATTERN PAIR $F2(A, B) = \{(1:1), (2:3), (3:4, 5), (5:6), (4:0), (0:2)\}$

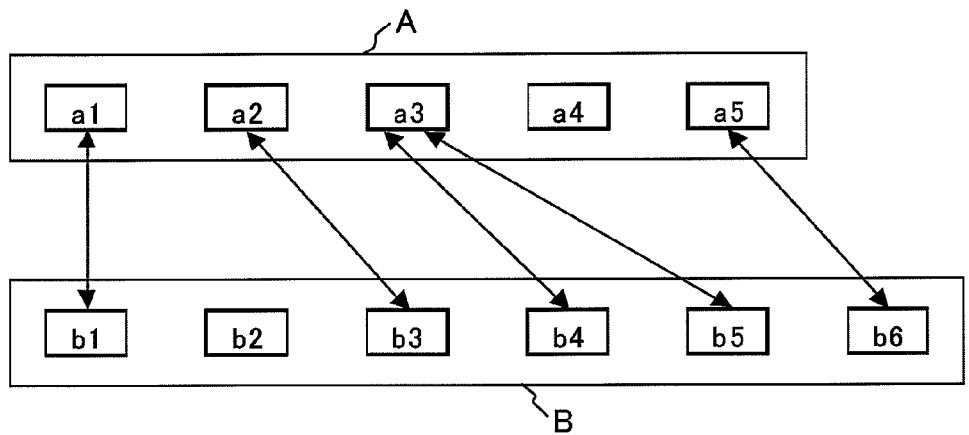

F2(A,B): CORRESPONDENCE RELATIONSHIP INFORMATION

A1~5: CHARACTER STRINGS OF EXAMPLE SENTENCE PATTERN A

B1~6: CHARACTER STRINGS OF EXAMPLE SENTENCE PATTERN B

FIG. 18
| EXAMPLE SENTENCE PATTERN A \ INPUT SENTENCE S' | 1 EMPTY CHARACTER STRING | 2 FX NO TANAKA-SAN | 3 NI | 4 KANARAZU | 5 WATASHI-TE-KUDASAI [WATASU TE KUDASARU] |
|---|---|---|---|---|---|
| 1 EMPTY CHARACTER STRING | 0(0,0,0) | 1(0,1,0) | 2(0,1,0) | 3(0,1,0) | 5(0,1,0) |
| 2 KANARAZU | 1(1,0,0) | 1.5(0,0,1) | 2.5(0,1,1) | 2(0,0,1) | 3(0,1,0) |
| 3 V1 | 2(1,0,0) | 1(0,0,1) | 2(0,1,0) | 3(1,1,0) | 3.5(0,0,1) |
| 4 WO | 3(1,0,0) | 2(1,0,0) | 2.5(0,0,1) | 3.5(0,1,1) | 4.5(0,1,1) |
| 5 V2 | 4(1,0,0) | 3(1,0,1) | 3.5(0,1,1) | 4(0,0,1) | 5(0,1,1) |
| 6 NI | 5(1,0,0) | 4(1,0,0) | 3(0,0,1) | 4(0,1,0) | 5(0,1,0) |
| 7 WATASHI-TE-KUDASAI [WATASU TE KUDASARU] | 6(1,0,0) | 5(1,0,0) | 4(1,0,0) | 4.5(0,0,1) | 4(0,0,1) |
F11(A,B) = {(1:0),(2:0),(3:0),(4:1),(5:2),(0:3),(6:4)}
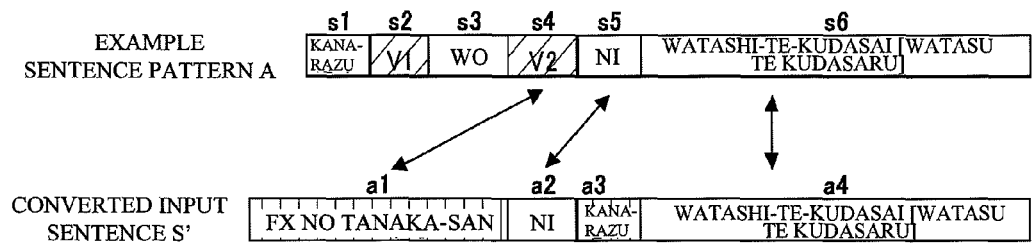
F12(A,B) = {(1:0),(2:1),(3:0),(4:0),(5:2),(0:3),(6:4)}
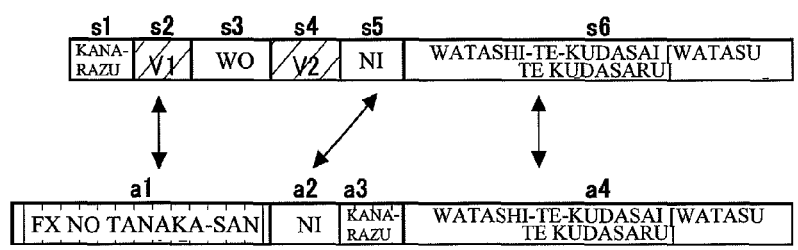
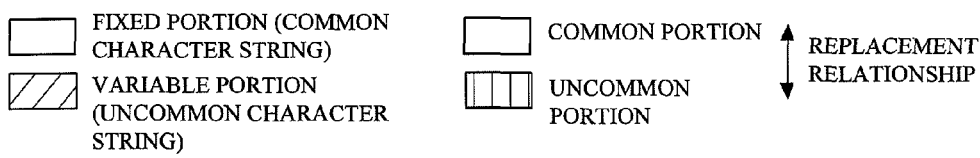

FIG. 25

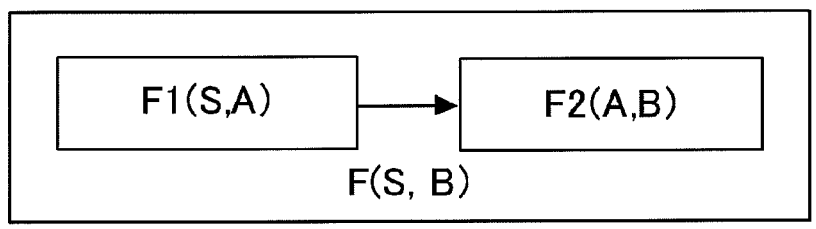

S: INPUT SENTENCE

A: EXAMPLE SENTENCE PATTERN UNDER WHICH INPUT SENTENCE S IS CLASSIFIED

B: TRANSLATED EXAMPLE SENTENCE PATTERN OF EXAMPLE SENTENCE PATTERN A

F: MAPPING FOR CONVERTING INPUT SENTENCE S INTO TRANSLATED EXAMPLE SENTENCE PATTERN B

F1: MAPPING FOR CONVERTING INPUT SENTENCE S INTO EXAMPLE SENTENCE PATTERN A

F2: MAPPING FOR CONVERTING EXAMPLE SENTENCE PATTERN A INTO TRANSLATED EXAMPLE SENTENCE PATTERN B

EXAMPLE-BASED TRANSLATION USING COMMON AND UNCOMMON PORTIONS OF AN INPUT SENTENCE

CROSS-REFERENCE TO RELATED APPLICATION

This application is based on and claims priority under 35 USC 119 from Japanese Patent Application No. 2007-301051 filed Nov. 20, 2007.

BACKGROUND

1. Technical Field

The present invention relates to a translation device, a computer readable medium, a computer data signal, and an information processing method.

2. Related Art

To improve the efficiency in translations, there has been a similar sentence search device that searches for a sentence similar to an original sentence to be translated.

Further, there has been a translation device that performs a translating operation, using a translated sentence pattern that is formed on the basis of the common features between a Japanese sentence and a sentence translated from the Japanese sentence.

SUMMARY

According to an aspect of the invention, there is provided a translation device that includes: a memory that stores character strings forming an example sentence pattern under which example sentences are classified based on character strings that form sentences, and character strings forming a translated example sentence pattern translated from the example sentence pattern, the character strings forming the example sentence pattern being associated with the character strings forming the translated example sentence pattern based on the meanings of the character strings; a converting unit that converts an input sentence into a sentence including common portions corresponding to common character strings shared by the example sentences classified under the example sentence pattern, and uncommon portions that are not the common portions, using a first indicator that indicates the degree of difference in meaning between character strings forming the input sentence to be translated and character strings forming the example sentence pattern stored in the memory; a calculating unit that calculates a second indicator that indicates the degree of difference between the input sentence and the example sentence pattern, based on a rule to associate the uncommon portions of the sentence converted by the converting unit with the uncommon character strings other than common character strings of the example sentence pattern, and on the first indicator that indicates the difference between the uncommon portions and the uncommon character strings; an extracting unit that extracts the example sentence pattern under which the input sentence is classified, based on the second indicator calculated by the calculating unit, and associates the uncommon portions of the sentence converted by the converting unit with the uncommon character strings of the example sentence pattern extracted by the extracting unit; and a translating unit that translates the input sentence, based on a mapping that associates the uncommon portions of the input sentence with the character strings forming the translated example sentence pattern that is stored in the memory and is associated with the uncommon character strings of the example sentence pattern extracted by the extracting unit.

BRIEF DESCRIPTION OF THE DRAWINGS

Exemplary embodiments of the present invention will be described in detail based on the following figures, wherein:

FIG. 5 illustrates an example structure of a bilingual example sentence pattern dictionary that is stored in the memory;

FIG. 18 illustrates an example of a relationship identifying operation to be performed by the relationship identifying unit;

FIG. 25 illustrates a mapping to be used by the translating unit to perform translation.

DETAILED DESCRIPTION

The following is a description of exemplary embodiments of the present invention, with reference to the accompanying drawings.

First Exemplary Embodiment

Figure 1:
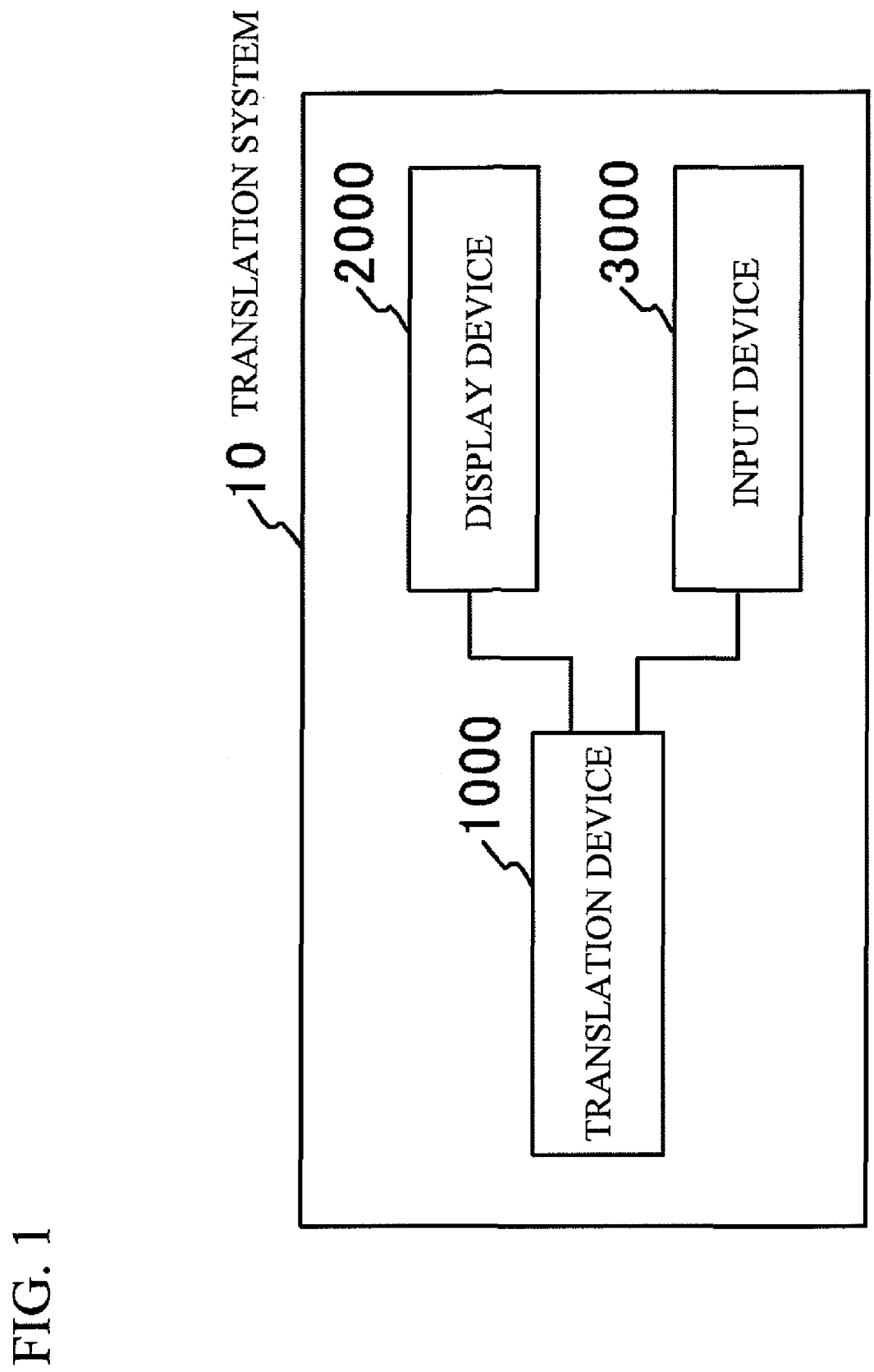
FIG. 1 illustrates the structure of one exemplary embodiment of a translation system that includes a translation device of the present invention.

FIG. 1 illustrates the structure of an exemplary embodiment of a translation system that includes a translation device of the present invention.

The translation system 10 shown in FIG. 1 includes a translation device 1000, a display device 2000, and an input device 3000.

The translation device 1000 may be a personal computer, for example, and is connected to the display device 2000 and the input device 3000.

The translation device 1000 acquires a sentence in a first language from the input device 3000, and translates the sentence into a second language. The translation device 1000 then causes the display device 2000 to display the translated sentence.

In this exemplary embodiment, the languages include not only natural languages such as Chinese, Japanese, and English, but also artificial languages such as Esperanto.

In this exemplary embodiment, the first language is Japanese, and the second language is Chinese. However, the present invention is not limited to that combination of languages, as long as the first and the second languages are different languages. For example, the first language may be Chinese, and the second language may be Japanese.

Figure 2:
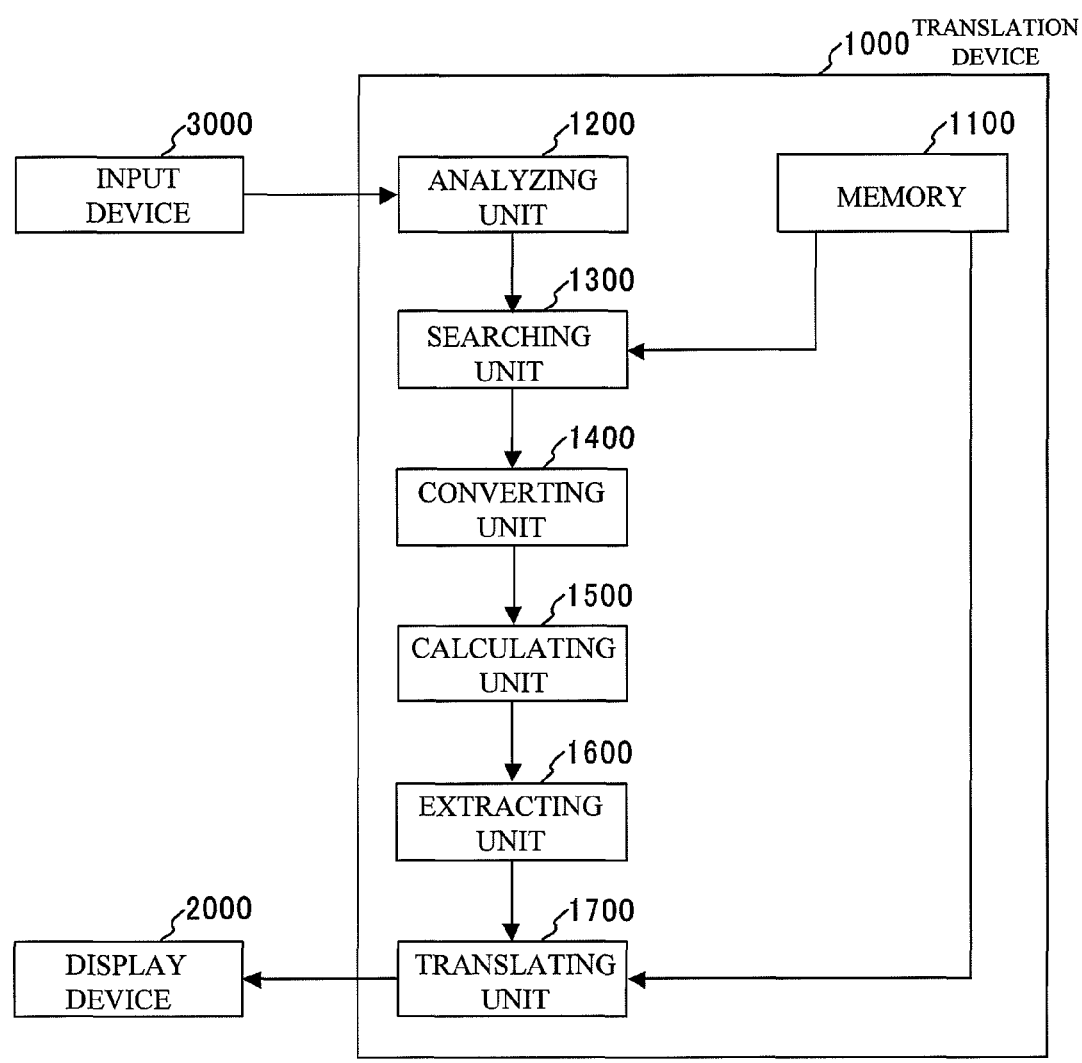
FIG. 2 illustrates an example structure of a translation device of the present invention.

Referring now to FIG. 2, the structure of the translation device 1000 is described. FIG. 2 shows an example structure of the translation device 1000.

The translation device 1000 shown in FIG. 2 includes a memory 1100, an analyzing unit 1200, a searching unit 1300, a converting unit 1400, a calculating unit 1500, an extracting unit 1600, and a translating unit 1700.

The functions of the analyzing unit 1200, the searching unit 1300, the converting unit 1400, the calculating unit 1500, the extracting unit 1600, and the translating unit 1700 can be realized through software control that is performed by the translation device 1000.

Figure 3:
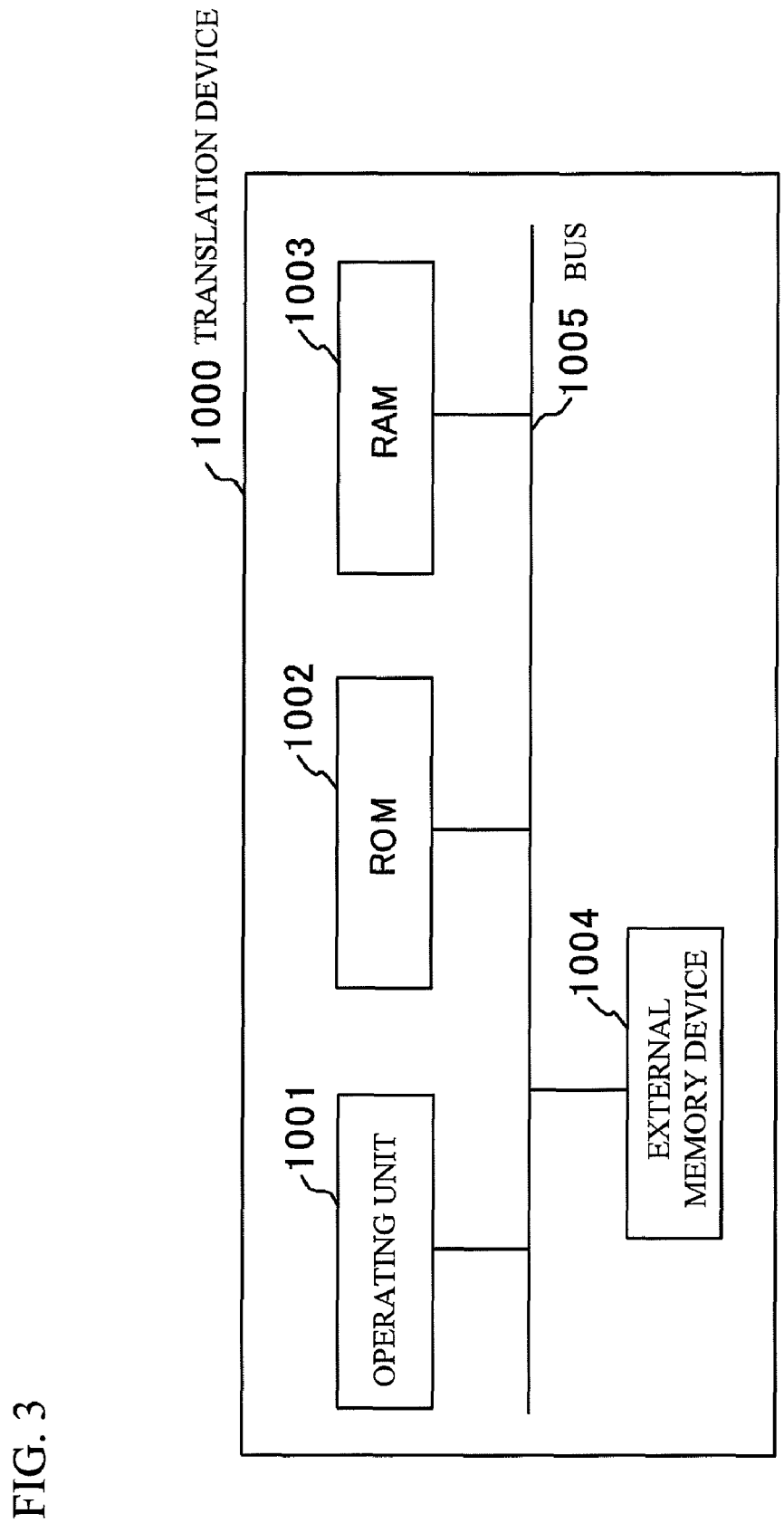
FIG. 3 illustrates an example structure of the hardware of a translation device for realizing software control.

Referring now to FIG. 3, the hardware structure of the translation device 1000 that performs the software control is described. FIG. 3 shows an example hardware structure of the translation device 1000 that performs the software control.

The translation device 1000 may be formed with an operating unit 1001 such as a CPU (Central Processing Unit), a ROM (Read-Only Memory) 1002 such as an EPROM (Erasable Programmable Read-Only Memory) or an EEPROM (Electrically Erasable Programmable Read-Only Memory), a RAM (Random Access Memory) 1003 that is a volatile memory such as a DRAM (Dynamic RAM) or a SRAM (Static RAM) or a nonvolatile memory such as a NVRAM (NonVolatile RAM), and an external memory 1004 such as a hard disk. The operating unit 1001, the ROM 1002, the RAM 1003, and the external memory 1004 are connected to one another by a bus 1005.

In the software control operation, the functions of the above described components are realized by the operating unit 1001 reading an application that is a program stored in the ROM 1002 or the external memory 1004, and performing an operation in accordance with the application. The data about the operation results is written in the RAM 1003, and more particularly, the data that needs to have a backup when the power is turned off is stored in a NVRAM.

Referring back to FIG. 2, explanation of the structure of the translation device 1000 is resumed.

The memory 1100 may be formed with the RAM 1003 or the external memory 1004, for example, and is connected to the searching unit 1300 and the translating unit 1700. The memory 1100 stores example sentence patterns by which example sentences are classified based on character strings forming sentences.

Figure 4:
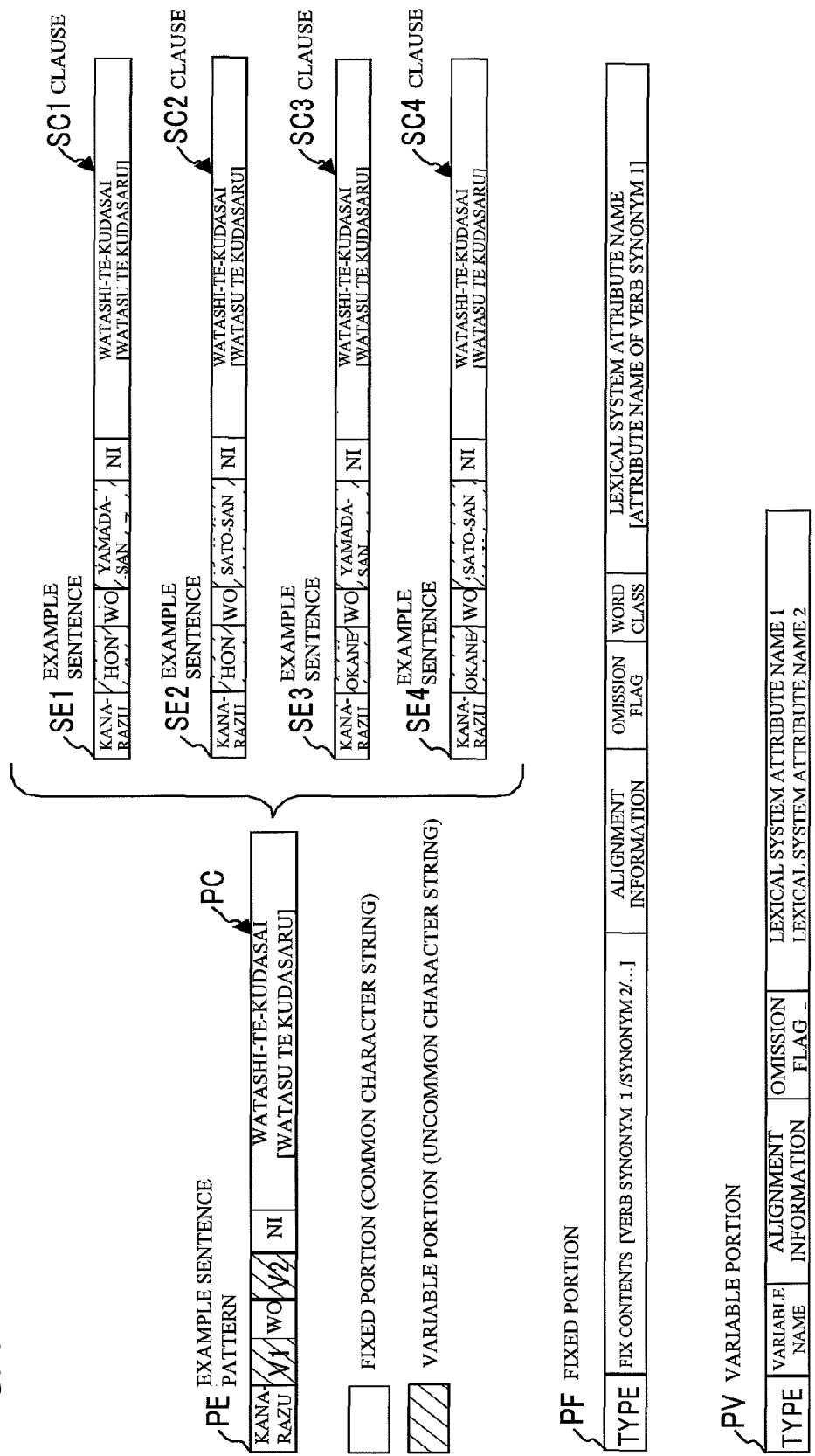
FIG. 4 shows an example sentence pattern.

Referring now to FIG. 4, an example sentence pattern is described. FIG. 4 shows an example sentence pattern. Example sentences SE1 through SE4 are classified under the example sentence pattern PE shown in FIG. 4.

The example sentence pattern PE is formed with fixed portions PF that are common words or clauses among the example sentences, and variable portions PV that are different types of words or clauses from the fixed portions PF but are words or clauses of common word classes among the example sentences. At the variable portions PV, the words or clauses of common word classes are represented by symbols such as V1 and V2.

Accordingly, the example sentence pattern PE includes character strings that are common among example sentences classified under the example sentence pattern PE (hereinafter referred to simply as the common character strings), and the variable portions PV are denoted by the symbols representing character strings that are not common among those example sentences (hereinafter referred to simply as the uncommon character strings). The uncommon character strings are character strings other than the common character strings in the example sentence pattern PE.

Grammatically, a clause is a sentence that starts with a subordinate conjunction or a relative, and is a complete sentence formed by combining a subject and a predicate. In this exemplary embodiment, however, a clause is formed by combining a word such as a verb, an adjective, or an adjective verb, and another word such as a particle, an auxiliary verb, or a subsidiary verb that can accompany the word. In this exemplary embodiment, verb clauses, adjective clauses, and adjective verb clauses can be formed. Accordingly, clauses are classified into those classes of verb clauses, adjective clauses, and adjective verb clauses.

More specifically, as shown in FIG. 4, the example sentence pattern PE includes clauses SC1 through SC4 that are "watashi-te-kudasai", and words PC that are a verb "watasu", a conjunctional particle "te", and an auxiliary verb "kudasaru".

The clause class of the clauses SC1 through SC4 and the words PC including the verb "watasu" and the words "te" and "kudasaru" accompanying the verb "watasu" is a verb clause class.

Each of the fixed portions PF includes not only words or clauses that are common among example sentences, but also FIX content information indicating synonyms, TYPE information indicating whether the subject portion is a variable portion or a fixed portion, class information indicating the class of each of the words constituting the subject fixed portion, and information indicating the name of the lexical system to which the words constituting the subject fixed portion belong.

Each of the variable portions PV includes variable name information indicating the common classes, TYPE information indicating whether the subject portion is a variable portion or a fixed portion, and information indicating the name of the lexical system to which the variable portion belongs.

In this exemplary embodiment, the variable name information includes a noun phrase indicating that a common word class is a noun class, an adjective phrase indicating that a common word class is an adjective class, and an adverb phrase indicating that a common word class is an adverb class.

In this exemplary embodiment, each of the variable portions PV is a word or a clause having a class that is common among the example sentences. However, the present invention is not limited to that arrangement, and a variable portion PV may be a word or a clause indicating contents of common properties. For example, a word or a clause indicating contents of common properties may be a word or a clause representing a time, a quantity, the name or a place, or the name of a person.

Referring back to FIG. 2, explanation of the structure of the translation device 1000 is resumed.

The memory 1100 stores first-language example sentence patterns associated with translated example sentence patterns that are example sentence patterns formed by translating the first-language example sentence patterns into the second language.

The memory 1100 also stores character strings that are the words, clauses and symbols constituting the first-language example sentence patterns (hereinafter referred to simply as the words and the likes). In the memory 1100, the character strings are associated with character strings that are the words and the likes constituting the translated example sentence patterns translated from the first-language example sentence patterns, based on the meanings of the respective character strings.

The information associating the example sentence patterns with the translated example sentence patterns is called a bilingual example sentence pattern dictionary. The searching unit 1300 and the translating unit 1700 refer to the bilingual example sentence pattern dictionary.

Referring now to FIG. 5, the bilingual example sentence pattern dictionary stored in the memory 1100 is described. FIG. 5 illustrates an example structure of the bilingual example sentence pattern dictionary stored in the memory 1100.

The bilingual example sentence pattern dictionary 1110 shown in FIG. 5 includes records 1 through n. Each of the records 1 through n stores an example sentence pattern A in the first language, a translated example sentence pattern B that is an example sentence pattern formed by translating the example sentence pattern A into the second language, an ID for identifying the pair of the example sentence pattern A and the translated example sentence pattern B (hereinafter referred to simply as the translation pattern pair), and correspondence relationship information F2 indicating the correspondence relationship between the character strings including the words forming the example sentence patterns A and B. In each of the records 1 through n, the example sentence patterns A and B, the ID, and the correspondence relationship information F2 are associated with one another. No two records among the records 1 through n store the same translation pattern pair.

Referring still to FIG. 5, the correspondence relationship information F2 stored in each of the records 1 through n is described. Here, the example sentence pattern A includes five character strings a1 through a5 such as words, and the translated example sentence pattern B includes six character strings b1 through b6 such as words.

The correspondence relationship information F2 indicates the correspondence relationships among the character strings, using the sequential order of the character strings to appear in the example sentence pattern A and the translated example sentence pattern B.

More specifically, in a case where a character string an that appears nth in the example sentence pattern A has the same meaning as a character string bm that appears mth in the translated example sentence pattern B, the correspondence relationship is expressed as "(n:m)".

In a case where the character string an that appears nth in the example sentence pattern A has the same meaning as two character strings that appear mth and m+1th in the translated example sentence pattern B, the correspondence relationship is expressed as "(n:m,m+1)".

In a case where two character strings an and an+1 that appear nth and n+1th in the example sentence pattern A have the same meaning as the character string bm that appears mth in the translated example sentence pattern B, the correspondence relationship is expressed as "(n,n+1:m)".

Likewise, in a case where two character strings an and an+1 that appear nth and n+1th in the example sentence pattern A have the same meaning as two character strings that appears mth and m+1th in the translated example sentence pattern B, the correspondence relationship is expressed as "(n,n+1:m, m+1)".

In this exemplary embodiments, there are cases where one character string used in the example sentence pattern A has the same meaning as one character string used in the translating example sentence pattern, where one character string has the same meaning as two character strings, where two character strings have the same meaning as one character string, and where two character strings have the same meaning as two character strings. However, the present invention is not limited to those cases.

For example, in a case where j (j>=1) character strings have the same meaning as k (k>=1) character strings, the correspondence relationship can be expressed as "(n,n+1, . . . ,n+j:m,m+1, . . . ,m+k)".

Further, in a case where a character string that has the same meaning as the character string an appearing nth in the example sentence pattern A is not used in the translated example sentence pattern B, the correspondence relationship is expressed as "(n:0)". In a case where a character string that has the same meaning as the character string bm appearing mth in the translated example sentence pattern B is not used in the example sentence pattern A, the correspondence relationship is expressed as "(0:m)".

Referring still to FIG. 5, an example case where the correspondence relationship information F2(A,B) is "(1:1), (2:3), (3:4,5), (5:6), (4:0), (0:2)" is described. The correspondence relationship information F2(A,B) indicates correspondence relationships in which: a character string a1 that appears first in the example sentence pattern A has the same meaning as a character string b1 that appears first in the translated example sentence pattern B; a character string a2 that appears second in the example sentence pattern A has the same meaning as a character string b3 that appears third in the translated example sentence pattern B; a character string a3 that appears third in the example sentence pattern A has the same meaning as character strings b4 and b5 that appear fourth and fifth in the translated example sentence pattern B; a character string a5 that appears fifth in the example sentence pattern A has the same meaning as a character string b6 that appears sixth in the translated example sentence pattern B; a character string that as the same meaning has a character string a4 that appears fourth in the example sentence pattern A does not appear in the translated example sentence pattern B; and a character string that has the same meaning as a character string b2 that appears second in the translated example sentence pattern B does not appear in the example sentence pattern A.

The memory 1100 also stores a tree to be used for searching for an example sentence pattern, based on words that form the example sentence pattern (hereinafter referred to simply as the search tree). The search tree has a TRIE structure that associates the words constituting an example sentence pattern with identification information for identifying the example sentence pattern.

In the field of linguistic information processing, a tree having a TRIE structure is called a tree structure that is formed by combining the character strings having common search keys. The searching unit 1300 refers to the search tree, as described above.

Figure 6:
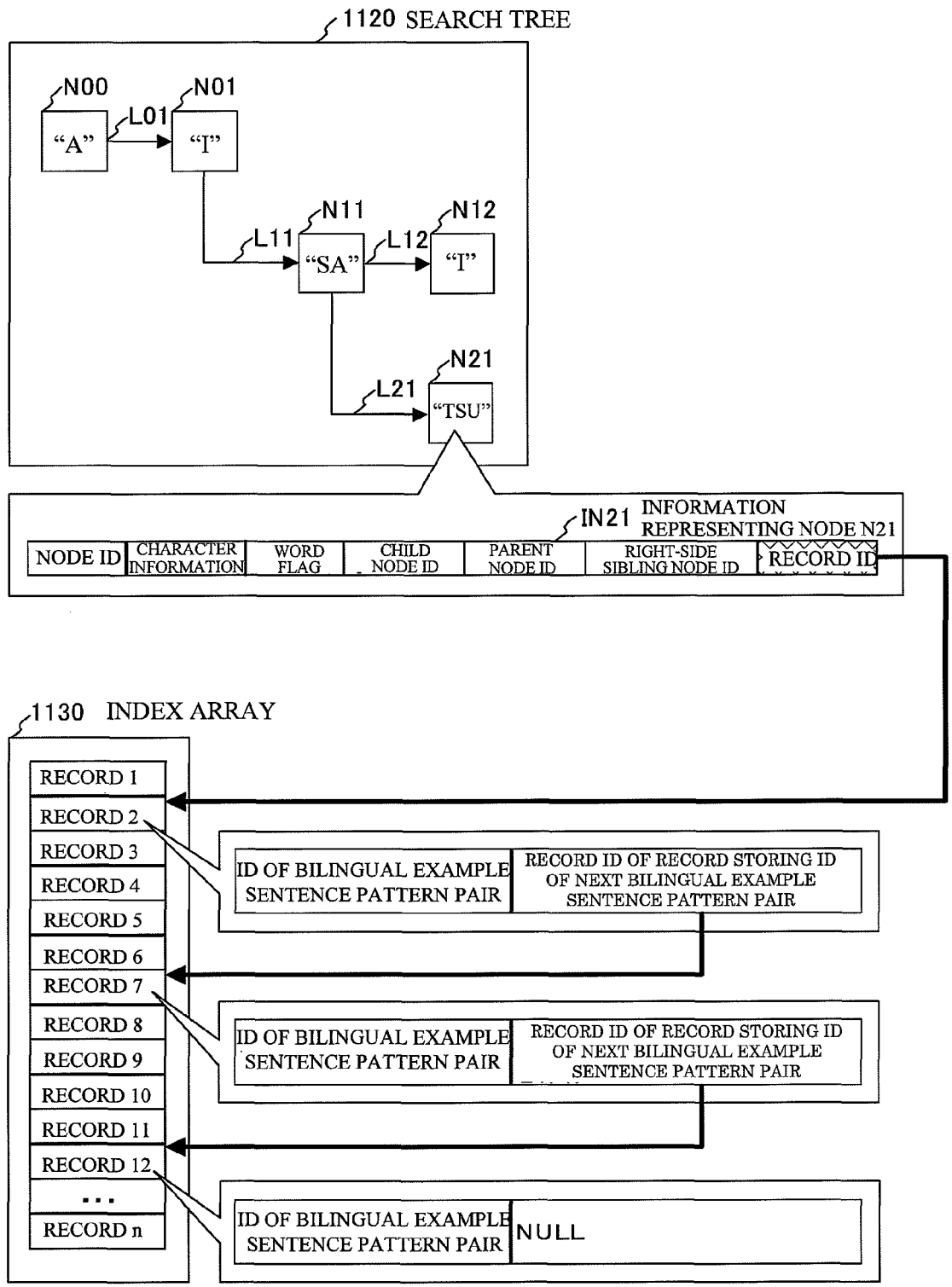
FIG. 6 shows an example of a search tree that is stored in the memory.

Referring now to FIG. 6, the search tree stored in the memory 1100 is described. FIG. 6 shows an example of the search tree stored in the memory 1100.

The search tree 1120 shown in FIG. 6 includes nodes N each representing one character, and links L connecting the nodes to one another with directions.

The search tree 1120 is a tree obtained with three search keys "ai", "aisai", and "aisatsu".

More specifically, the character string "ai" that are common among the search keys "ai", "aisai", and "aisatsu" is indicated by combining a node N00 representing the character "a", a node N01 representing the character "i", and a link L01 connecting the node N00 to the node N01.

Likewise, the character string "aisa" that are common between the search keys "aisai" and "aisatsu" is indicated by combining the node N00 representing the character "a", the node N01 representing the character "i", a node N11 representing the character "sa", the link L01 connecting the node N00 to the node N01, and a link L11 connecting the node N01 to the node N11.

The node N00 is called a root. Accordingly, each search key is a character string that is formed by arranging the characters represented by the nodes N, starting from the root node N00 until reaching the node N with a later described word flag through the route indicated by the links L.

In the case of the search key "aisai", for example, this search key is a character string that is formed by arranging the characters represented by the nodes N00, N01, N11, and N12, starting from the root N00 until reaching the node N12 with a word flag through the route indicated by the links L01, L11, and L12.

In the search tree 1120, a node N that is located at a hierarchical level immediately above a subject node N and has a link L extending to the subject node N is a parent node with respect to the subject node N. A node N that is located at a hierarchical level immediately below the subject node N and has a link L extending thereto is a child node with respect to the subject node N. A node N located at the same hierarchical level as the subject node N and has a link L extending thereto is a right-side sibling node.

In the case of the node N11, for example, the node N01 is a parent node for the node N11, the node N21 is a child node, and the node N12 is a right-side sibling node.

Next, the information that is stored in the memory 1100 and indicates the search tree 1120 is described.

The information indicating the search tree 1120 includes information indicating the nodes N of the search tree 1120. The information indicating a node N includes: a node ID that is the information for identifying the node N; character information that indicates the character represented by the node N; a word flag that indicates the last character of a search key; a child node ID that indicates the node ID of a child node of the node N; a parent node ID that indicates the node ID of a parent node of the node N; a right-side sibling node ID that indicates the node ID of a right-side sibling node of the node N; and a record ID. The record ID in the information indicating the node N is the information for identifying the record that is an element in an index array.

The memory 1100 also stores an index array 1130. The searching unit 1300 refers to the index array 1130, as described later.

In each of the records in the index array 1130, the information for identifying example sentence patterns including the same word (the same search key) (the ID of a translation pattern pair) is associated with the ID of a record in which other information for identifying example sentence patterns including the same word is stored. In this manner, a list structure is formed.

Accordingly, the record ID in the information indicating the node N is the identification information about the record that stores the information for identifying example sentence patterns including the search key formed by the characters represented by the nodes starting from the root N00 to the node N.

More specifically, as shown in FIG. 6, the record ID in the information IN12 indicating the node N12 is the identification information about the record 2 that stores the information for identifying example sentence patterns including the search key "aisatsu" formed by the characters represented by the nodes starting from the root N00 to the node N12.

As a specific example, in the record 2 that is an element of the index array 1130, the translation pattern pair ID for identifying example sentence patterns including the same word "aisatsu" is associated with the record ID of the record 7 that stores other information for identifying example sentence patterns including the same word "aisatsu". In the record 7, the translation pattern pair ID for identifying example sentence patterns including the word "aisatsu" is associated with the record ID of the record 12 that stores other information for identifying example sentence patterns including the same word "aisatsu". In this manner, the list structure is formed.

In this exemplary embodiment, each node N represents one character in a search key. However, the present invention is not limited to that, and it is possible to employ a structure in which each node N indicates whether a character in a search key is a high-byte character or a low-byte character in a case each one character in the search key is represented by one byte.

The memory 1100 further stores a word dictionary in which words in the first language are associated with words in the second language based on the meanings of the words, and a bilingual example sentence dictionary in which clauses or sentences in the first language are associated with clauses or sentences in the second language based on the meanings of the clauses or sentences. The translating unit 1700 refers to the word dictionary and the bilingual example sentence dictionary, as described later.

Referring back to FIG. 2, explanation of the structure of the translation device 1000 is resumed.

The analyzing unit 1200 is connected to the searching unit 1300 and the input device 3000. The analyzing unit 1200 performs the later described analyzing operation to carry out a morphologic analysis on an input sentence that is input as a sentence to be translated from the input device 3000. In this manner, the analyzing unit 1200 obtains the morphemes in the input sentence.

An example of the analyzing operation to be performed by the analyzing unit 1200 is now described.

First, the analyzing unit 1200 acquires an input sentence in the first language from the input device 3000. The analyzing unit 1200 then carries out a morphologic analysis on the input sentence, and obtains morphemes.

The analyzing unit 1200 integrates the morphemes that are a verb, an adjective, and an adjective verb, and a particle, an auxiliary verb, and a subordinate verb that accompany the verb, the adjective, and the adjective verb. In this manner, one clause is formed.

The analyzing unit 1200 outputs the words and clause formed with the obtained morphemes to the searching unit 1300. The analyzing unit 1200 then ends the analyzing operation.

Since each sentence to be analyzed by the analyzing unit 1200 in this exemplary embodiment is in Japanese as the first language, "Chasen" of Nara Institute of Science and Technology can be used in the morphologic analysis to be carried out by the analyzing unit 1200.

In a case where the first language is Chinese, the Seg & Pos tool of Tsinghua University or CiPosSDK of Northeastern University (China) can be used in the morphologic analysis.

The searching unit 1300 is connected to the memory 1100, the analyzing unit 1200, and the converting unit 1400. The searching unit 1300 performs the later described searching operation to search for example sentence patterns formed with the words included in the input sentence.

Figure 7:
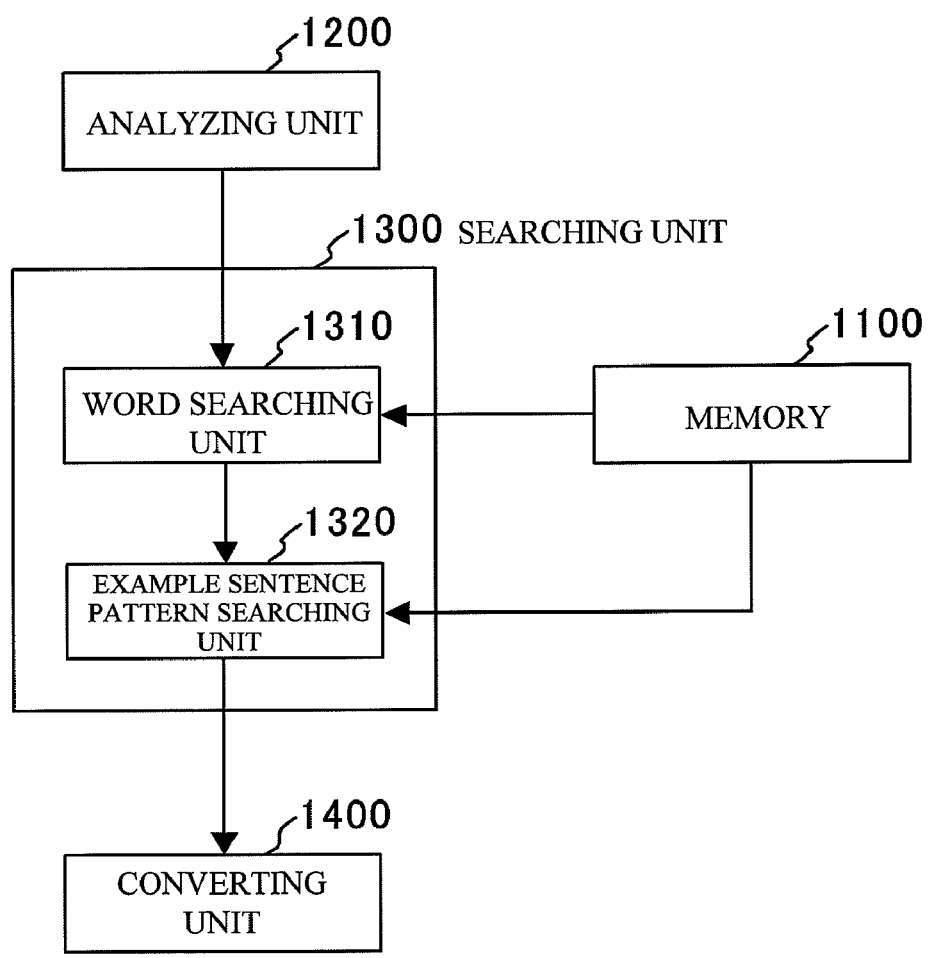
FIG. 7 is a functional block diagram showing an example structure of the searching unit.

Referring now to FIG. 7, the structure of the searching unit 1300 is described. FIG. 7 is a functional block diagram showing an example structure of the searching unit 1300.

The searching unit 1300 shown in FIG. 7 includes a word searching unit 1310 and an example sentence pattern searching unit 1320.

The word searching unit 1310 is connected to the memory 1100, the analyzing unit 1200, and the example sentence pattern searching unit 1320. The word searching unit 1310 performs the later described word searching operation to obtain the record ID for identifying a record that is an element of the index array. The record identified by the record ID detected by the word searching unit 1310 stores the identification information for identifying example sentence patterns formed with the words included in the input sentence.

An example of the word searching operation to be performed by the word searching unit 1310 is now described.

First, the word searching unit 1310 acquires the words and clauses included in the input sentence from the analyzing unit 1200. The word searching unit 1310 extracts a word included in the input sentence from the acquired words and clauses.

After that, the word searching unit 1310 searches the search tree stored in the memory 1100 for the search key that matches the extracted word. The word searching unit 1310 then identifies the node representing the last character in the detected search key.

The word searching unit 1310 obtains the information indicating the identified node, and also obtains the record ID from the index array 1130. The word searching unit 1310 outputs the obtained record ID to the example sentence pattern searching unit 1320.

The word searching unit 1310 also outputs the words and clauses obtained from the analyzing unit 1200 to the example sentence pattern searching unit 1320. After that, the word searching unit 1310 ends the word searching operation.

The example sentence pattern searching unit 1320 is connected to the memory 1100, the word searching unit 1310, and the converting unit 1400. The example sentence pattern searching unit 1320 performs the later described example sentence pattern searching operation to search for example sentence patterns including a word that is included in the input sentence.

An example of the example sentence pattern searching operation to be performed by the example sentence pattern searching unit 1320 is now described.

First, the example sentence pattern searching unit 1320 obtains a record ID from the word searching unit 1310. The example sentence pattern searching unit 1320 also obtains the words and clauses of an input sentence.

The example sentence pattern searching unit 1320 then searches for a record that is an element of the index array stored in the memory 1100, based on the record ID.

After that, the example sentence pattern searching unit 1320 obtains the identification information for identifying example sentence patterns stored in the detected record (the ID of a translation example sentence pattern pair), and a record ID for identifying another record. The example sentence pattern searching unit 1320 then searches for a pair of an example sentence pattern and a translated example sentence pattern and the correspondence relationship information F2, based on the obtained identification information.

After that, the example sentence pattern searching unit 1320 determines whether the detected record stores the record ID for identifying another record. If the detected record stores the ID for identifying another record, the example sentence pattern searching unit 1320 repeats the above described operation for the other record ID. If the detected record does not store the ID for identifying another record, the example sentence pattern searching unit 1320 outputs the detected example sentence pattern, the translated example sentence pattern, and the correspondence relationship information F2 to the converting unit 1400.

The example sentence pattern searching unit 1320 also outputs the acquired input sentence, and the words and clauses of the input sentence. The example sentence pattern searching unit 1320 then ends the example sentence pattern searching operation.

Referring back to FIG. 2, explanation of the structure of the translation device 1000 is resumed.

The converting unit 1400 is connected to the searching unit 1300 and the calculating unit 1500. The converting unit 1400 performs the later described converting operation to convert an input sentence into a sentence formed with common portions corresponding to the common character strings that are common among example sentences classified under a subject example sentence pattern, and uncommon portions other than the common portions. The converting operation is performed with the use of a first indicator of the degree of the difference in meaning between the character strings forming an input sentence and the character strings forming example sentence patterns stored in the memory. After that, the converting unit 1400 outputs the converted input sentence to the calculating unit 1500.

Figure 8:
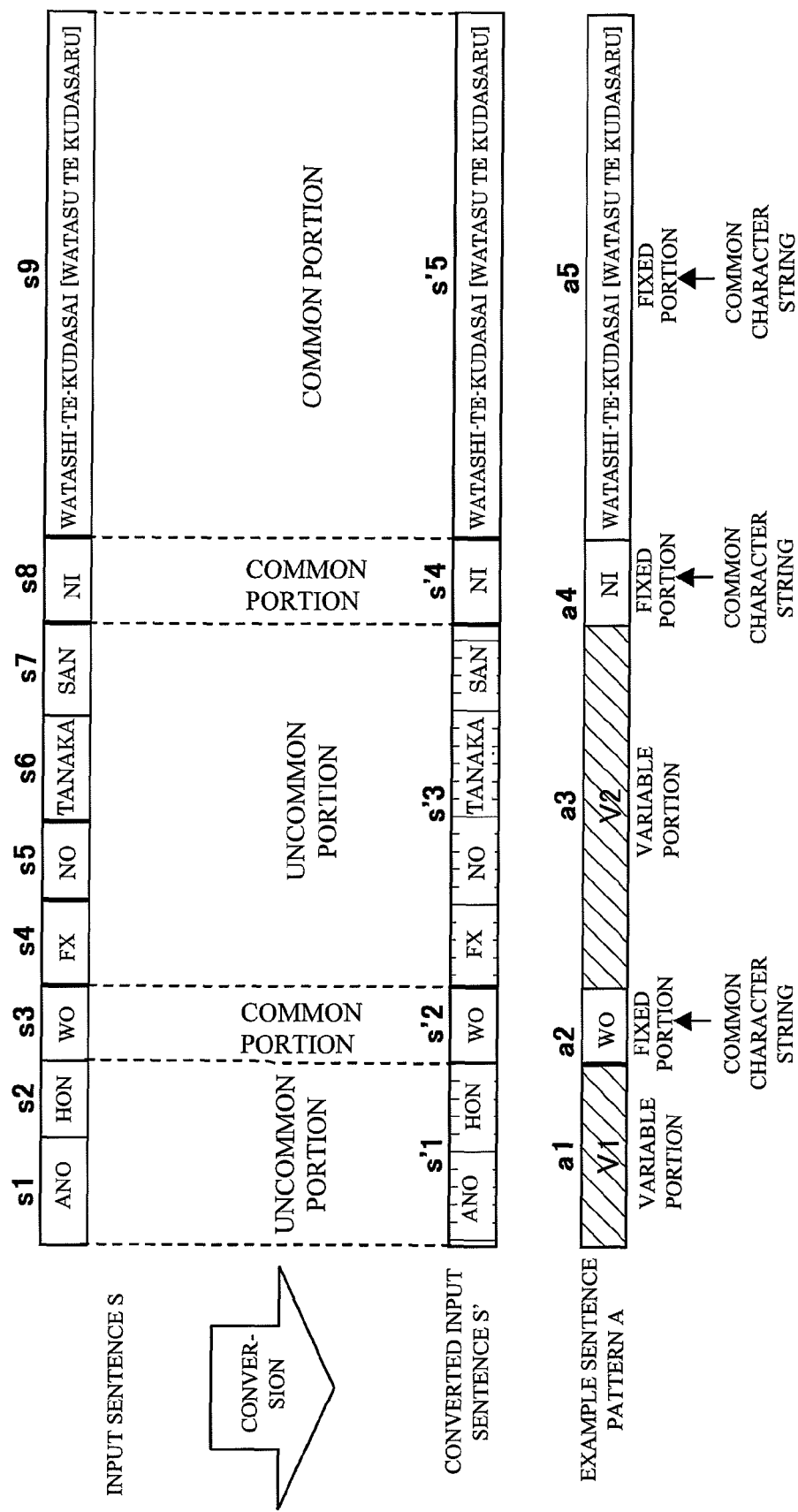
FIG. 8 shows the character strings forming an input sentence to be converted by the converting unit, and the converted character strings.

Referring now to FIG. 8, character strings formed with the words and clauses forming an input sentence to be converted by the converting unit 1400, and character strings forming a converted input sentence are described. FIG. 8 shows the character strings forming an input sentence to be converted by the converting unit 1400, and the character strings after the conversion.

FIG. 8 illustrates an input sentence S formed with character strings s1 through s9 to be converted by the converting unit 1400, and a converted input sentence S' formed with converted character strings s'1 through s'5, and an example sentence pattern A formed with the same words as the words forming the input sentence S.

The converted input sentence S' includes a word s'1 formed by combining the words s1 and s2 of the input sentence S converted by the converting unit 1400 performing a converting operation based on the example sentence pattern A, a word s'3 formed by combining the words s4 through s7, words s'2 and s'4 not subjected to a combining operation, and a clause s'5. The words s'2 and s'4 and the clause s'5 are the same as the words s3, s8, and the clause s9, respectively.

Based on the word s3 included in the group consisting of fixed portions a2, a4, and a5 of the example sentence pattern A, the converting unit 1400 combines the words s1 and s2, and, based on the word s8, combines the words s4 through s7.

In this converting operation, the converting unit 1400 converts the input sentence S into a sentence formed with common portions and uncommon portions, with the common portions being the character strings s'2, s'4, and s'5 corresponding to the common character strings a2, a4, and a5 forming the fixed portions, and with the uncommon portions being the character strings s'1 and s'3 other than the common portions.

Figure 9:
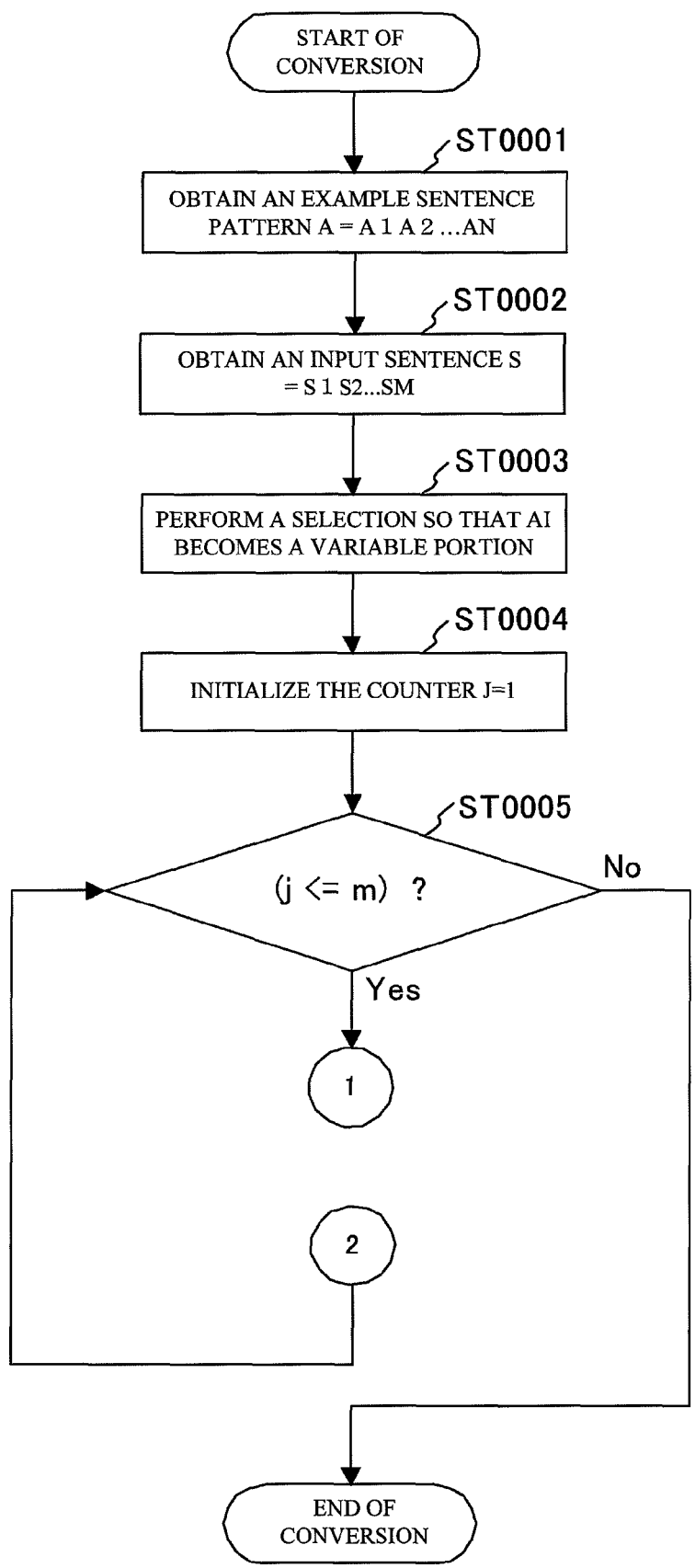
FIG. 9 is a flowchart showing a part of a converting operation to be performed by the converting unit.
Figure 10:
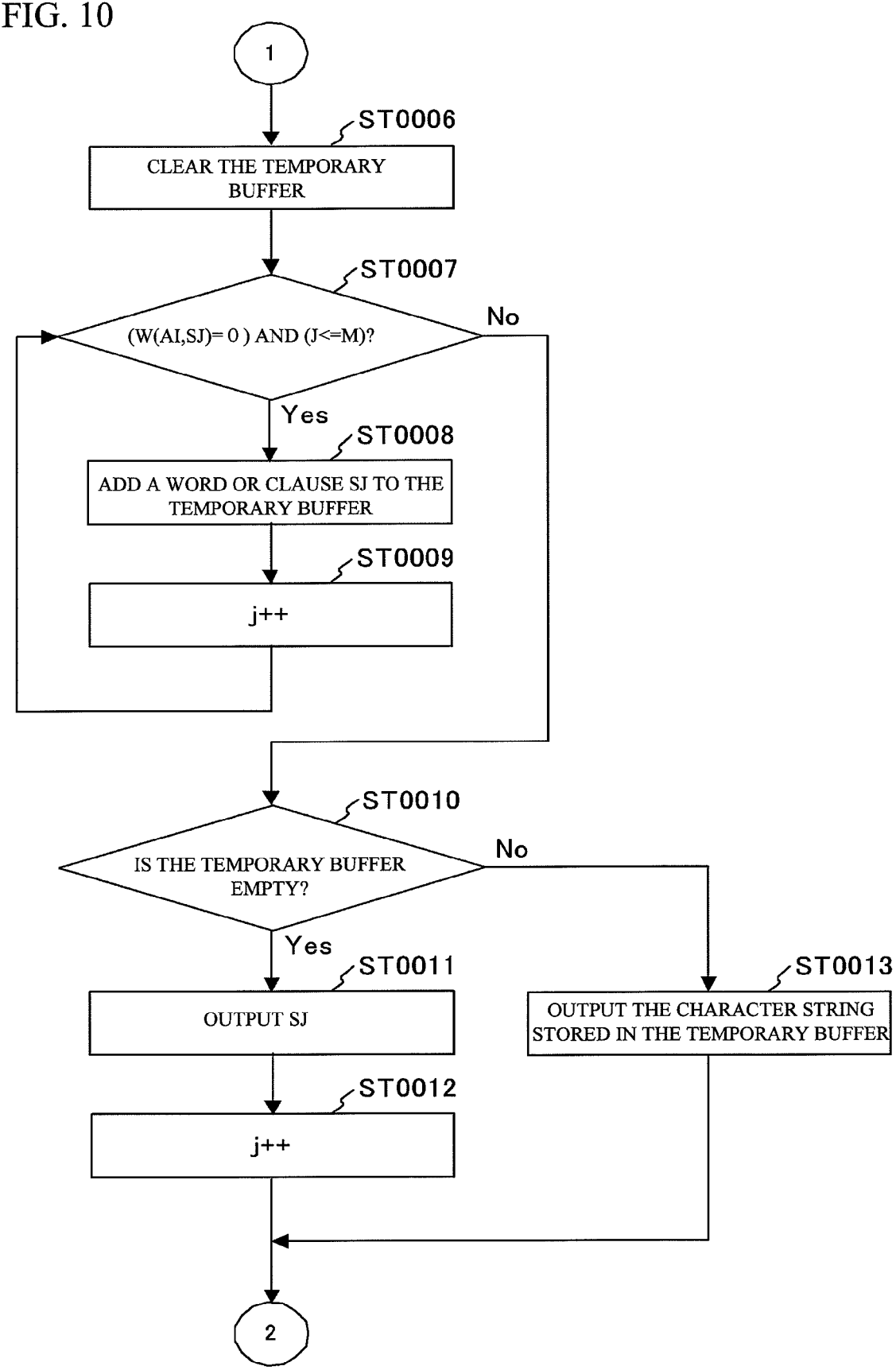
FIG. 10 is a flowchart showing the remaining part of the converting operation to be performed by the converting unit.

Referring now to FIGS. 9 and 10, the converting operation to be performed by the converting unit 1400 is described. FIGS. 9 and 10 are flowcharts showing an example of the converting operation to be performed by the converting unit 1400.

First, the converting unit 1400 obtains the example sentence pattern A and character strings such as the words forming the example sentence pattern A from the searching unit 1300 (step ST0001). The example sentence pattern A is formed with character strings a1 through an, and a character string ai is the character string that appears ith in the example sentence pattern A.

The converting unit 1400 then obtains the input sentence S and the character strings that are the words and clause forming the input sentence S from the searching unit 1300 (step ST0002). The input sentence S is formed with character strings s1 through sm, and a character string sj is the character string that appears jth in the input sentence S.

Although not shown in the flowchart, the converting unit 1400 also obtains the translated example sentence pattern and the correspondence relationship information F2 associated with the example sentence pattern A from the searching unit 1300.

After that, the converting unit 1400 inputs a suitable arbitrary value to a counter i, so that the character string ai becomes a variable portion (step ST0003).

The converting unit 1400 then initializes a counter j by assigning the value "1" to the counter j that indicates the order in which the character strings forming the input sentence S are used in a sentence (step ST0004).

After that, the converting unit 1400 determines whether the counter j is equal to or smaller than the value m (step ST0005). If the counter j is equal to or smaller than the value m, the converting unit 1400 carries out the procedure of step ST0006. If the counter j is larger than the value m, the converting unit 1400 ends the converting operation.

If the counter j is determined to be equal to or smaller than the value m in step ST0005, the converting unit 1400 clears the temporary buffer (step ST0006).

The converting unit 1400 then determines whether the first indicator of the character string ai that appears ith in the example sentence pattern A and the character string sj that appears jth in the input sentence S (the first indicator will also be hereinafter referred to simply as the weight) is "0", and whether the variable j is equal to or smaller than the value "m" (step ST0007).

Here, the weight is the indicator that indicates the degree of difference in meaning between the character string sj of the input sentence S that is input as a subject to be translated and the character string ai of the example sentence pattern A stored in the memory 1100. How to calculate the weight will be described later.

If the weight of the character string ai and the character string sj (hereinafter referred to also as w(ai,sj)) is determined to be "0", and the variable j is determined to be equal to or smaller than the value "m", the converting unit 1400 carries out the procedure of step ST0008. If the weight is determined not to be "0", and the variable j is determined not to be equal to or smaller than the value "m", the converting unit 1400 carries out the procedure of step ST0010.

If the weight of the character string ai and the character string sj is determined to be "0", and the variable j is determined to be equal to or smaller than the value "m" in step ST0007, the converting unit 1400 adds the character string sj that is a word or clause to the character strings stored in the temporary buffer (step ST0008).

The converting unit 1400 then increments the variable j by "1" (step ST0009). After that, the converting unit 1400 returns to step ST0007 to repeat the above described procedure.

If the weight of the character string ai and the character string sj is determined not to be "0", and the variable j is determined to be larger than the value "m" in step ST0007, the converting unit 1400 determines whether the temporary buffer is empty (step ST0010). If the temporary buffer is empty, the converting unit 1400 carries out the procedure of step ST0011. If the temporary buffer is not empty, the converting unit 1400 carries out the procedure of step ST0013.

If the converting unit 1400 determines that the temporary buffer is empty in step ST0010, the converting unit 1400 outputs the character string sj as a character string that is a common portion or an uncommon portion (step ST0011). The converting unit 1400 then increments the variable j by "1" (step ST0012). After that, the converting unit 1400 returns to step ST0005, and repeats the above described procedures.

If the converting unit 1400 determines that the temporary buffer is not empty in step ST0010, the converting unit 1400 outputs a character string stored in the temporary buffer as a character string that is a common portion or an uncommon portion (step ST0013). The converting unit 1400 then returns to step ST0005, and repeats the above described procedures.

Although not shown in the flowchart, the converting unit 1400 outputs the converted input sentence, the example sentence pattern A, the translated example sentence pattern, and the correspondence relationship information F2 to the calculating unit 1500.

Referring now to Table 1, examples of calculations to be performed to determine weights of the character string ai used in the example sentence pattern A and the character string sj used in the input sentence S are described. Table 1 shows examples of weight values to be calculated, and the conditions for calculating those values.

TABLE 1

| VALUE OF W | TYPE OF AI | TYPE OF SJ | OTHERS |
|---|---|---|---|
| 0 | VARIABLE | WORD OR CLAUSE | SJ IS NOT INCLUDED IN THE SET OF FIXED PORTIONS OF AN EXAMPLE SENTENCE PATTERN |
| p | VARIABLE | WORD OR CLAUSE | SJ IS INCLUDED IN THE SET OF FIXED PORTIONS OF AN EXAMPLE SENTENCE PATTERN |
| 0 | FIXED | WORD OR CLAUSE | AI AND SJ ARE THE SAME |
| 0 | FIXED | WORD OR CLAUSE | SJ IS A SYNONYM OF A FIXED PORTION |
| p | FIXED | WORD OR CLAUSE | AI AND SJ ARE NOT THE SAME, AND SI IS NOT A SYNONYM OF A FIXED PORTION |

As shown in Table 1, in a case where the character string ai of the example sentence pattern A is a variable portion, the character string sj is a word or clause, and the character string sj is not included in the group containing the fixed portions of the example sentence pattern A as its elements, the converting unit 1400 determines that the weight value is "0".

In a case where the character string ai is a variable portion, the character string sj is a word or clause, and the character string sj is included in the group containing the fixed portions of the example sentence pattern A as its elements, the converting unit 1400 determines that the weight value is a value "p". Here, the value "p" is a positive constant. Although the value "p" is "1.5" in this exemplary embodiment, it is not limited to that value.

In a case where the character string ai is a fixed portion, the character string sj is a word or clause, and the character strings ai and sj are equal to each other, the converting unit 1400 determines that the weight value is "0".

In a case where the character string ai is a fixed portion, the character string sj is a word or clause, and the character string sj is a synonym of the fixed portion, the converting unit 1400 determines that the weight value is "0".

In this exemplary embodiment, the converting unit 1400 determines whether the word sj is a synonym of a fixed portion, based on the FIX contents forming the fixed portion PF described with reference to FIG. 4. However, the present invention is not limited to that arrangement. For example, the memory 1100 may store a synonym dictionary having words associated with synonyms of the words. The converting unit 1400 may refer to the dictionary stored in the memory 1100, so as to determine whether the word sj is a synonym of a fixed portion.

Further, in a case where the character string ai is a fixed portion, the character string sj is a word or clause, the character strings ai and sj are not equal to each other, and the character string sj is not a synonym of the fixed portion, the converting unit 1400 determines that the weight value is the value "p".

Figure 11:
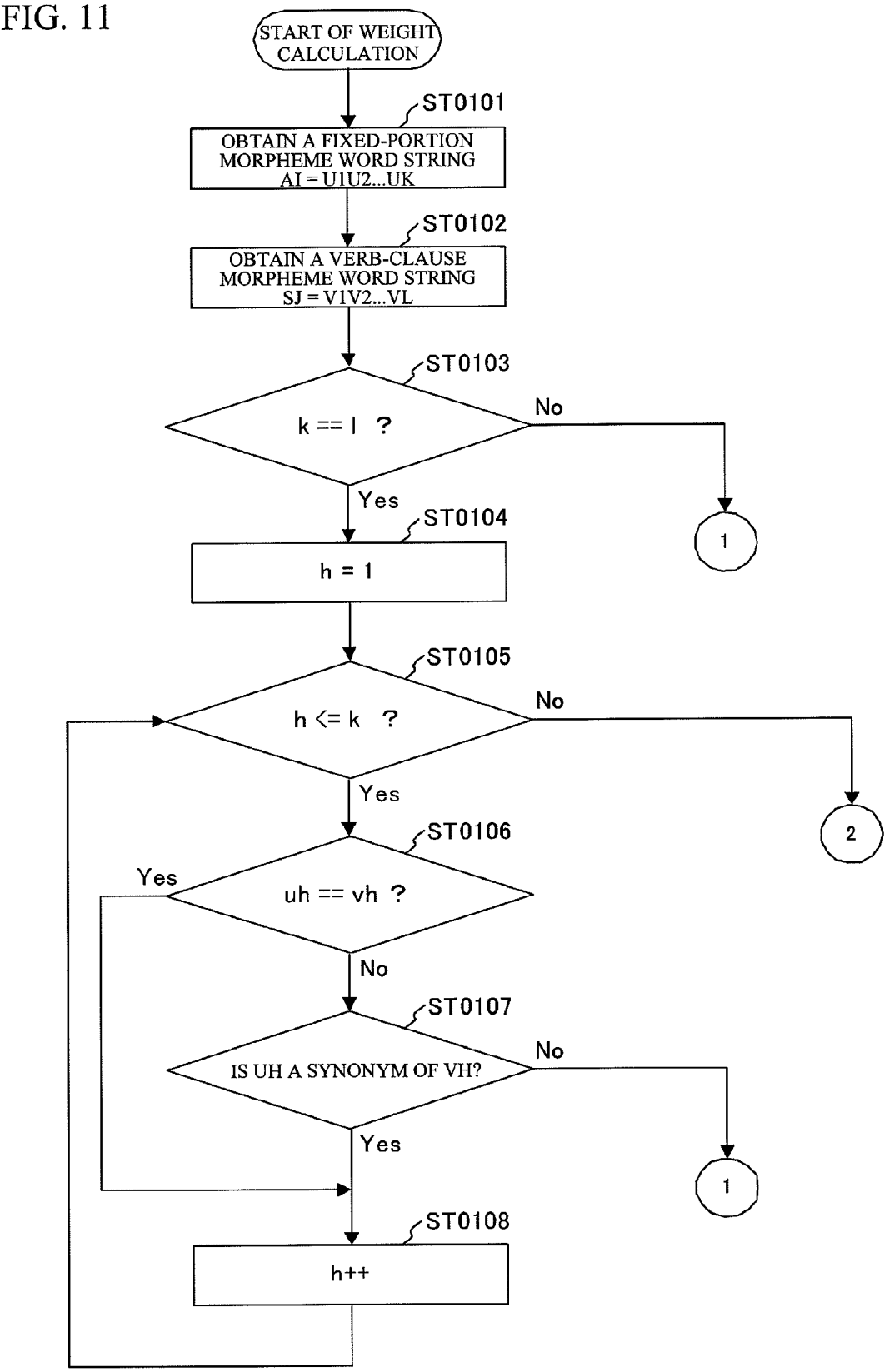
FIG. 11 is a flowchart showing a part of a weight calculating operation to be performed by the converting unit to calculate a weight.
Figure 12:
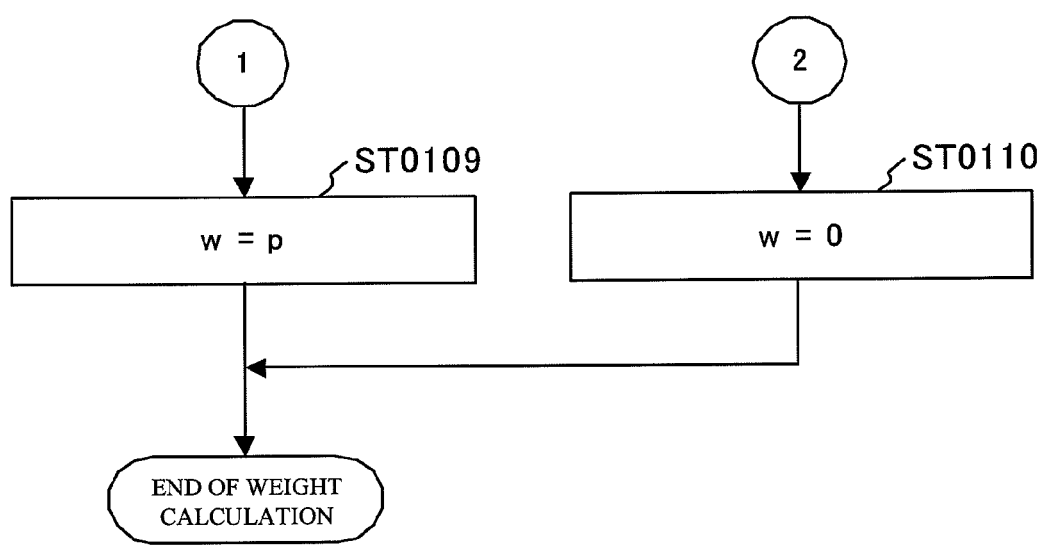
FIG. 12 is a flowchart showing the remaining part of the weight calculating operation to be performed by the converting unit to calculate a weight.

Referring now to Table 2 and FIGS. 11 and 12, another example of the method of calculating a weight of a verb clause ai and a clause sj is described. Table 2 shows other examples of weight values to be calculated, and other examples of conditions for calculating those weight values. FIG. 11 is a flowchart showing a part of a weight calculating operation to be performed by the converting unit 1400 calculating a weight. FIG. 12 is a flowchart showing the remaining part of the weight calculating operation to be performed by the converting unit 1400 calculating a weight.

TABLE 2

| VALUE OF W | TYPE OF AI | TYPE OF SJ | OTHERS |
|---|---|---|---|
| 0 | FIXED | VERB CLAUSE | AI AND SJ ARE THE SAME |
| 0 | FIXED | VERB CLAUSE | MORPHEME WORD STRING OF FIXED PORTION = MORPHEME WORD STRING OF VERB CLAUSE |

As shown in Table 2, in a case where a character string ai of an example sentence pattern is a fixed portion, a character string sj is a verb clause, and the character strings ai and sj are equal to each other, the converting unit 1400 determines that the weight value is "0".

In a case where the character string ai of the example sentence pattern is a fixed portion, the character string sj is a verb clause, and all the morpheme words forming the character string ai are equal to all the morpheme words forming the character string sj, the converting unit 1400 determines that the weight value is "0". Here, if the word "masu" is in the morpheme words or the morphemes forming a clause, the word "masu" is eliminated, and a weight calculation is then performed.

The calculating operation to be performed by the converting unit 1400 to calculate the weights shown in Table 2 is described.

First, the converting unit 1400 obtains a morpheme word string of a fixed portion ai (step ST0101). The morpheme word string of the fixed portion ai is formed with morpheme words u1 through uk, and a morpheme word uh is the morpheme word that appears hth in the morpheme word string ai.

The converting unit 1400 then obtains a morpheme word string of a verb clause sj (step ST0102). The morpheme word string of the verb clause sj is formed with morpheme words v1 through vl, and a morpheme word vh is the morpheme word that appears hth in the morpheme word string sj.

After that, the converting unit 1400 determines whether the number k of morpheme words in the fixed portion ai is equal to the number l of morpheme words in the verb clause sj (step ST0103). If the converting unit 1400 determines that the number k and the number l are equal to each other, the converting unit 1400 carries out the procedure of step ST0104. If the number k and the number l are not equal, the converting unit 1400 carries out the procedure of step ST0109.

If the converting unit 1400 determines that the number k and the number l are equal in step ST0103, the converting unit 1400 initializes a counter h by assigning the value "1" to the counter h that indicates the order in which the morpheme words are used in the morpheme word string (step ST0104).

The converting unit 1400 then determines whether the value of the counter variable h is equal to or smaller than the number k of morpheme words in the fixed portion ai (step ST0105). If the converting unit 1400 determines that the value of the variable h is equal to or smaller than the number k, the converting unit 1400 carries out the procedure of step ST0106. If the converting unit 1400 determines that the value of the variable h is larger than the number k, the converting unit 1400 carries out the procedure of step ST0110.

If the converting unit 1400 determines that the value of the variable h is equal to or smaller than the number k in step ST0105, the converting unit 1400 determines whether the morpheme word uh that appears hth in the clause ai is equal to the morpheme word vh that appears hth in the clause sj (step ST0106). If the converting unit 1400 determines that the morpheme word uh is the same as the morpheme word vh, the converting unit 1400 carries out the procedure of step ST0108. If the converting unit 1400 determines that the morpheme word uh is not the same as the morpheme word vh, the converting unit 1400 carries out the procedure of step ST0107.

If the converting unit 1400 determines that the morpheme word uh is not the same as the morpheme word vh in step ST0106, the converting unit 1400 determines whether the morpheme word uh is a synonym of the morpheme word vh (step ST0107). If the converting unit 1400 determines that the morpheme word uh is a synonym of the morpheme word vh, the converting unit 1400 carries out the procedure of step ST0108. If the converting unit 1400 determines that the morpheme word uh is not a synonym of the morpheme word vh, the converting unit 1400 carries out the procedure of step ST0109.

If the converting unit 1400 determines that the morpheme word uh is the same as the morpheme word vh in step ST0106, or if the converting unit 1400 determines that the morpheme word uh is a synonym of the morpheme word vh in step ST0107, the converting unit 1400 increments the loop variable h by "1" (step ST0108). After that, the converting unit 1400 returns to step ST0105, and repeats the above described procedures.

It the converting unit 1400 determines that the number k and the number l are not equal in step ST0103, or if the converting unit 1400 determines that the morpheme word uh is not a synonym of the morpheme word vh in step ST0107, the converting unit 1400 determines that the weight of the clause ai and the clause sj is "p" (step ST0109). Here, p is a positive constant. After that, the converting unit 1400 ends the converting operation.

If the converting unit 1400 determines that the value of the variable h is larger than the number k in step ST0105, the converting unit 1400 determines that the weight of the clause ai and the clause sj is "0" (step ST0110). After that, the converting unit 1400 ends the converting operation.

Referring back to FIG. 2, explanation of the structure of the translation device 1000 is resumed.

The calculating unit 1500 is connected to the converting unit 1400 and the extracting unit 1600. The calculating unit 1500 performs the later described calculating operation to calculate a second indicator (hereinafter referred to also simply as the distance) that indicates the degree of difference between the input sentence S and the example sentence pattern A, based on the rules by which the uncommon portions of the sentence converted by the converting unit 1400 are associated with the uncommon character strings of the example sentence pattern A, and on the first indicator (or the weight) that indicates the degree of difference between the uncommon portions and the uncommon character strings.

The calculating operation to be performed by the calculating unit 1500 is an operation to calculate the second indicator according to one or more of the following rules: a rule that applies to a case where one or more of the common character strings and uncommon character strings of the example sentence pattern are mapped onto one or more of the common portions and uncommon portions of the sentence converted by the converting unit 1400, and the common character strings are replaced with the common portions in one-to-one correspondence without crisscrossing; a rule that applies to a case where one or more of the common character strings and uncommon character strings of the example sentence pattern are mapped onto one or more of the common portions and uncommon portions of the sentence converted by the converting unit 1400, and the uncommon character strings are replaced with the uncommon portions in one-to-one correspondence without crisscrossing; a rule that applies to a case where one or more of the common character strings and uncommon character strings of the example sentence pattern are mapped onto one or more of the common portions and uncommon portions of the sentence converted by the converting unit 1400, and one or more of the common character strings and the uncommon character strings are deleted; a rule that applies to a case where one or more of the common character strings and uncommon character strings of the example sentence pattern are mapped onto one or more of the common portions and uncommon portions of the sentence converted by the converting unit 1400, and one or more of the common portions and the uncommon portions are inserted.

Figure 13:
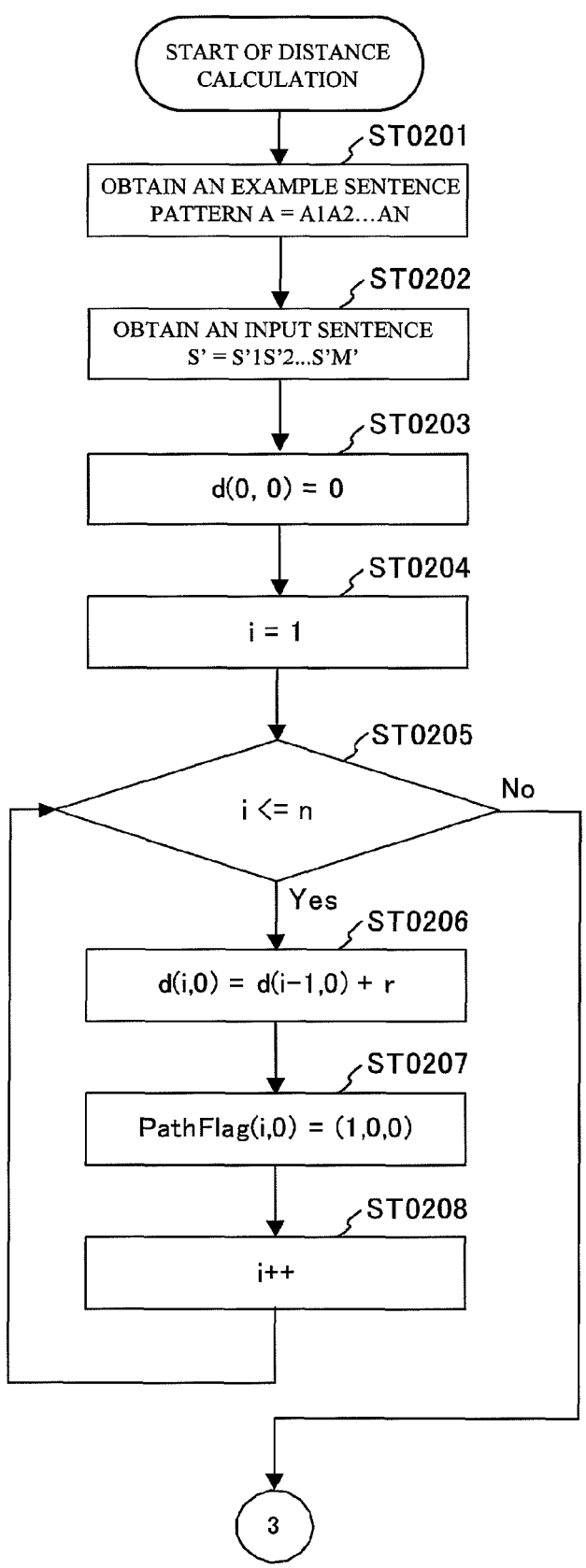
FIG. 13 is a flowchart showing a part of a distance calculating operation to be performed by the calculating unit.
Figure 14:
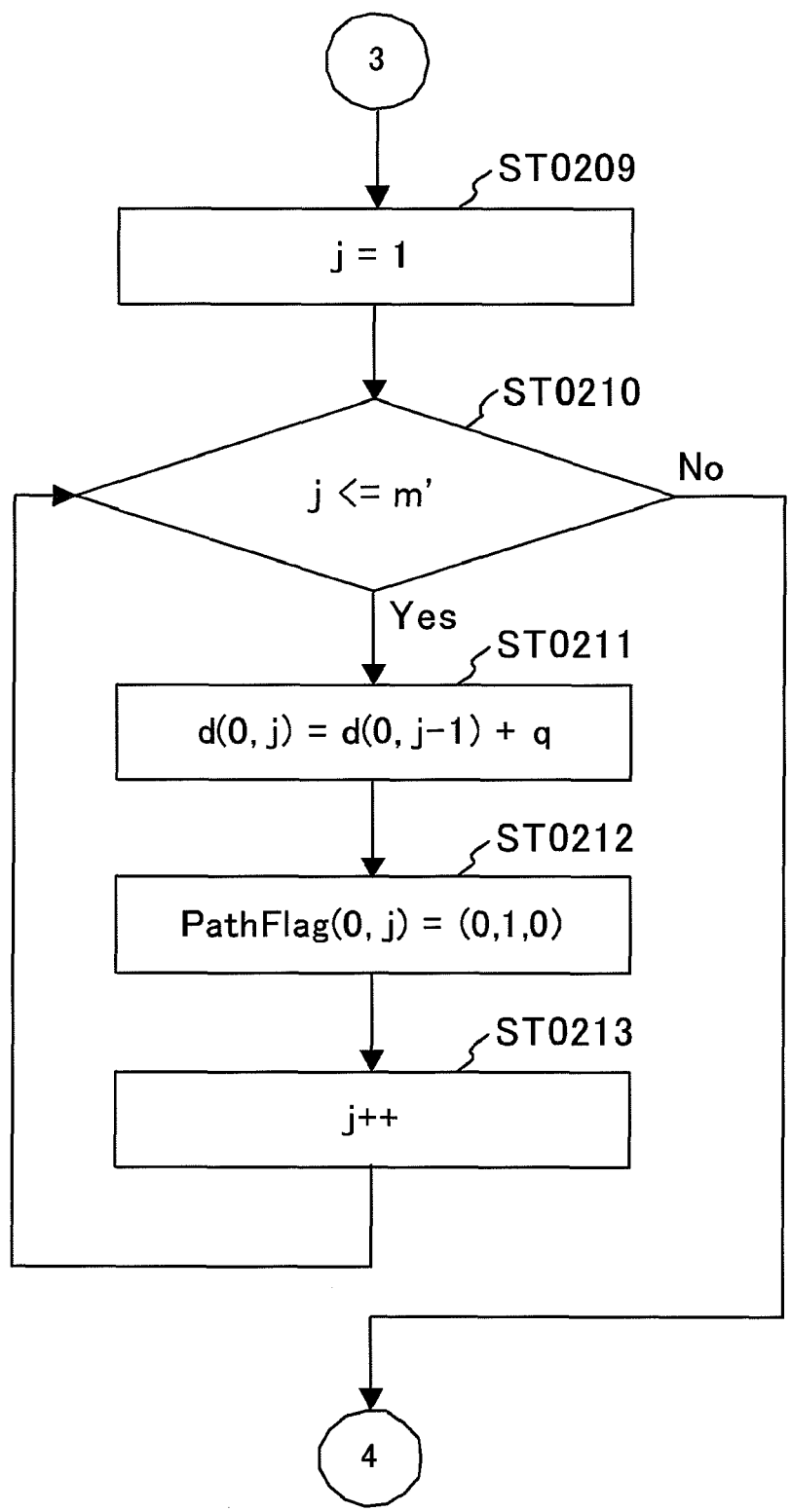
FIG. 14 is a flowchart showing another part of the distance calculating operation to be performed by the calculating unit.
Figure 15:
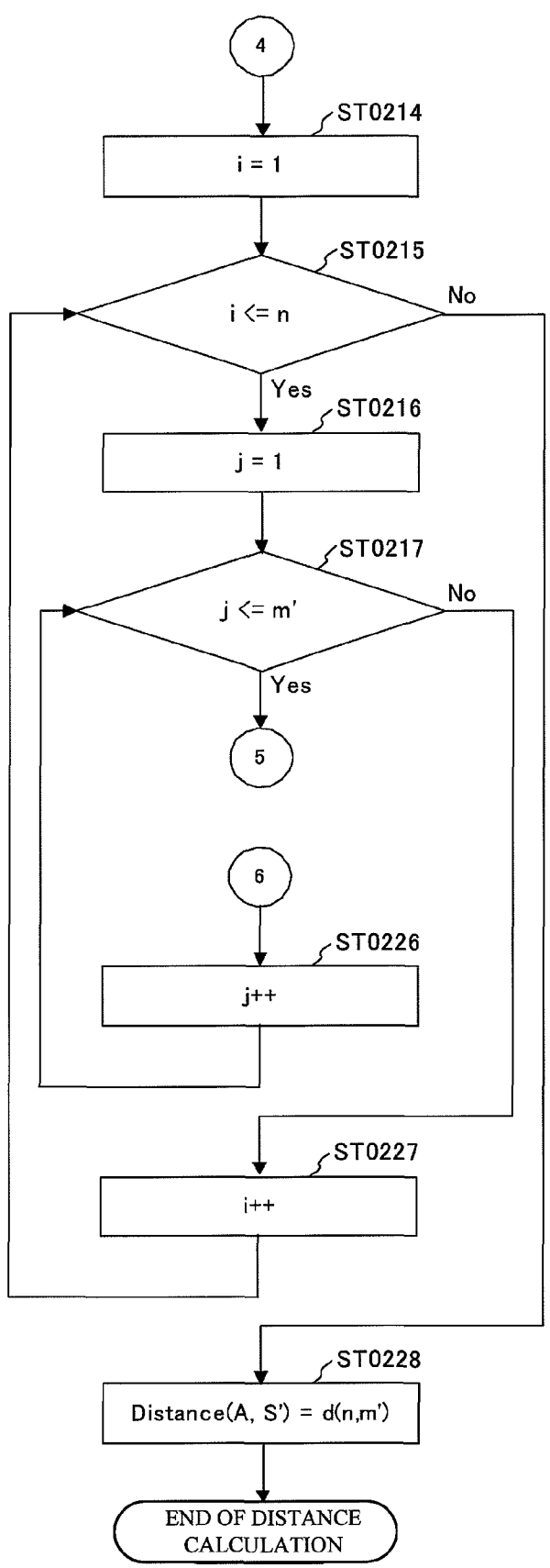
FIG. 15 is a flowchart showing yet another part of the distance calculating operation to be performed by the calculating unit.
Figure 16:
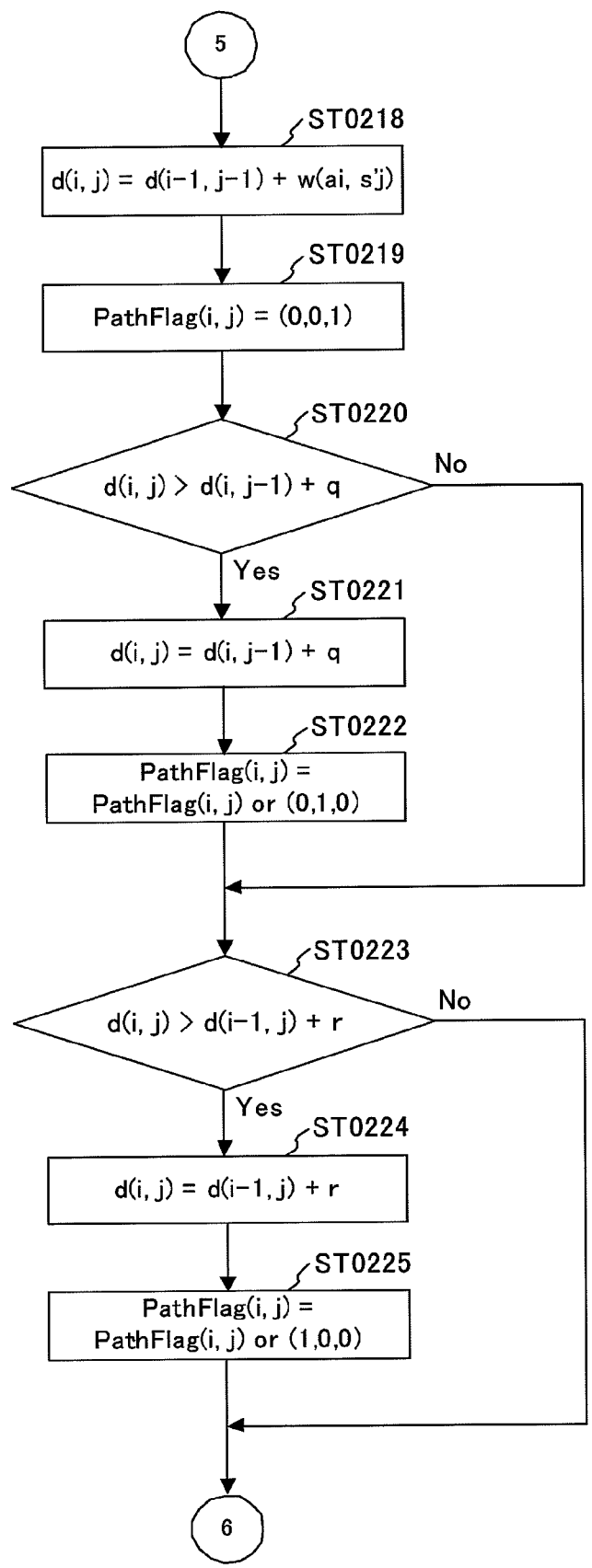
FIG. 16 is a flowchart showing the remaining part of the distance calculating operation to be performed by the calculating unit.

Referring now to FIGS. 13 through 16, the distance calculating operation to be performed by the calculating unit 1500 is described. FIG. 13 is a flowchart showing a part of an example of the distance calculating operation to be performed by the calculating unit 1500. FIGS. 14 through 16 are flowcharts showing the remaining parts of the example of the distance calculating operation to be performed by the calculating unit 1500.

First, the calculating unit 1500 obtains an example sentence pattern A from the converting unit 1400 (step ST0201). The example sentence pattern A is formed with character strings a1 through an that are words and the likes.

The calculating unit 1500 then obtains a converted input sentence S' from the converting unit 1400 (step ST0202). The converted input sentence S' is formed with character strings s'1 through s'm' that are converted words or clauses.

After that, the calculating unit 1500 initializes a variable d(0,0) by assigning the value "0" to the variable d(0,0) (step ST0203).

Although not shown in the flowchart, the calculating unit 1500 also obtains the translated example sentence pattern and the correspondence relationship information F2 associated with the example sentence pattern A, from the converting unit 1400.

Here, a variable d(i,j) is the second indicator (or the distance) that indicates the degree of difference between a character string a1a2 . . . ai formed by arranging the character strings a1 through ai of the example sentence pattern A in the order of appearances in the example sentence pattern A, and a character string s'1s'2 . . . s'j formed by arranging the converted words or clauses s'1 through s'j of the input sentence S' in the order of appearances in the input sentence S'.

Particularly, the variable d(0,0) is the second indicator that indicates the degree of difference between an input sentence having no character strings (an empty character string) and an example sentence pattern having no character strings such as words.

The calculating unit 1500 then initializes a variable i by assigning the value "1" to the variable i that indicates the order in which the character strings appear in the example sentence pattern A (step ST0204). After that, the calculating unit 1500 determines whether the variable i is equal to or smaller than the number "n" of character strings forming the example sentence pattern A (step ST0205). If the calculating unit 1500 determines that the variable i is equal to or smaller than "n", the calculating unit 1500 carries out the procedure of step ST0206. If the calculating unit 1500 determines that the variable i is larger than "n", the calculating unit 1500 carries out the procedure of step ST0209.

If the calculating unit 1500 determines that the variable i is equal to or smaller than "n" in step ST0205, the calculating unit 1500 sets the value of d(i,0) as "d(i−1,0)+r" (step ST0206).

The calculating unit 1500 then sets the value of a variable PathFlag(i,0) as "(1,0,0)" (step ST0207). After that, the calculating unit 1500 increments the variable i by 1 (step ST0208). After that, the calculating unit 1500 returns to step ST0205, and repeats the above described procedures.

The relationship between the variable PathFlag(i,0) and the distance d(i,j) is now explained.

The distance d(i,j) between a1a2 . . . ai of the example sentence pattern A and s'1s'2 . . . s'j of the converted input sentence S' is determined based on the mapping that associates the character strings a1 through ai forming the example sentence pattern a1a2 . . . ai with the character strings s'1 through s'j forming the converted input sentence S' s'1s'2 . . . s'j.

The mapping that defines the distance d(i,j) may be a mapping formed by combining a mapping that associates the character strings a1 through ai−1 of the example sentence pattern a1a2 . . . ai with the character strings s'1 through s'j of the converted input sentence s'1s'2 . . . s'j in one-to-one correspondence without crisscrossing, with a mapping that defines the rule to delete the character string ai from the example sentence pattern A in a case where the character string ai of the example sentence pattern A is not mapped onto a character string of the input sentence S'.

The mapping that defines the distance d(i,j) may also be a mapping formed by combining a mapping that associates the character strings a1 through ai with the character strings s'1 through s'j−1 in one-to-one correspondence without crisscrossing, with a mapping that defines the rule to insert the character string sj of the input sentence S' in a case where the character strings of the example sentence pattern A are not mapped onto the character strings of the input sentence S'.

The mapping that defines the distance d(i,j) may also be a mapping formed by combining a mapping that associates the character strings a1 through ai−1 with the character strings s'1 through s'j−1 in one-to-one correspondence without crisscrossing, with a mapping that defines the rule to replace the character string ai of the example sentence pattern A with the character string sj of the input sentence S'.

Accordingly, with the distance defined by the mapping to delete the character string ai being r, the distance d(i,j) is calculated as "d(i,j)=d(i−1,j)+r". In this calculation, the distance d(i,j) is calculated with the use of the mapping to delete the character string ai, with the value of the flag variable PathFlag (i,j) being "(1,0,0)" indicating the method of calculating the distance d(i,j).

Also, with the distance defined by the mapping to insert the character string s'j being q, the distance d(i,j) is calculated as "d(i,j)=d(i,j−1)+q". In this calculation, the distance d(i,j) is calculated with the use of the mapping to insert the character string s'j, with the value of the flag variable PathFlag (i,j) being "(0,1,0)".

Further, where the distance defined by the mapping to replace the character string ai with the character string s'j in one-to-one correspondence without crisscrossing is set as w(ai,s'j), the distance d(i,j) is calculated as "d(i,j)=d(i−1,j−1)+w(ai,s'j)". In this calculation, the distance d(i,j) is calculated with the use of the mapping to replace the character string ai with the character string s'j, with the value of the flag variable PathFlag (i,j) being "(0,0,1)".

The distance w(ai,s'j) is a function that reflects the value defined by the character strings ai and s'j, and is the first indicator described with reference to FIG. 9.

In this exemplary embodiment, explanation is made with "q=r=1, p=1.5". However, those values are not limited to the above, and other suitable values that are determined through experiments and logics can be used.

Referring back to FIG. 13, explanation of an example of the distance calculating operation to be performed by the calculating unit 1500 is resumed.

If the calculating unit 1500 determines that the variable i is larger than "n" in step ST0205, the calculating unit 1500 initializes a variable j by assigning the value "1" to the variable j that indicates the order in which the converted character strings appear in the input sentence S' (step ST0209).

The calculating unit 1500 then determines whether the variable j is equal to or smaller than the number "m'" of converted character strings forming the input sentence S' (step ST0210). If the calculating unit 1500 determines that the variable j is equal to or smaller than "m'", the calculating unit 1500 carries out the procedure of step ST0211. If the calculating unit 1500 determines that the variable j is not equal to or smaller than "m'", the calculating unit 1500 carries out the procedure of step ST0214.

If the calculating unit 1500 determines that the variable j is equal to or smaller than "m'" in step ST0210, the calculating unit 1500 sets the value of d(0,j) as "d(0,j−1)+q" (step ST0211).

The calculating unit 1500 then sets the value of the variable PathFlag(0,j) as "(0,1,0)" (step ST0212). After that, the calculating unit 1500 increments the variable j by 1 (step ST0213). The calculating unit 1500 then returns to step ST0210, and repeats the above described procedures.

If the calculating unit 1500 determines that the variable j is larger than "m'" in step ST0210, the calculating unit 1500 assigns the value "1" to the variable i (step ST0214). The calculating unit 1500 then determines whether the variable i is equal to or smaller than "n" (step ST0215). If the calculating unit 1500 determines that the variable i is equal to or smaller than "n", the calculating unit 1500 carries out the procedure of step ST0216. If the calculating unit 1500 determines that the variable i is not equal to or smaller than "n", the calculating unit 1500 carries out the procedure of step ST0228.

If the calculating unit 1500 determines that the variable i is equal to or smaller than "n" in step ST0215, the calculating unit 1500 assigns the value "1" to the variable j (step ST0216). The calculating unit 1500 then determines whether the variable j is equal to or smaller than "m'" (step ST0217). If the calculating unit 1500 determines that the variable j is equal to or smaller than "m'", the calculating unit 1500 carries out the procedure of step ST0218. If the calculating unit 1500 determines that the variable j is not equal to or smaller than "m'", the calculating unit 1500 carries out the procedure of step ST0227.

If the calculating unit 1500 determines that the variable j is equal to or smaller than "m'" in step ST0217, the calculating unit 1500 sets the value of d(i,j) as "d(i−1,j−1)+w(ai,s'j)" (step ST0218). The calculating unit 1500 then sets the value of the variable PathFlag(i,j) as "(0,0,1)" (step ST0219).

After that, the calculating unit 1500 determines whether the distance d(i,j−1)+q calculated based on the mapping to insert a character string s'i is smaller than the distance d(i,j) calculated based on the mapping to replace the word or clause ai with the word or clause s'j in step ST0218 (step ST0220). If the calculating unit 1500 determines that the distance d(i,j−1)+q is smaller than the distance d(i,j), the calculating unit 1500 carries out the procedure of step ST0221. If the calculating unit 1500 determines that the distance d(i,j−1)+q is not smaller than the distance d(i,j), the calculating unit 1500 carries out the procedure of step ST0223.

If the calculating unit 1500 determines that the distance d(i,j−1)+q is smaller than the distance d(i,j) in step ST0220, the calculating unit 1500 sets the distance d(i,j) as "d(i,j−1)+q" (step ST0221).

The calculating unit 1500 then sets the variable PathFlag (i,j) as the value obtained by performing an OR operation between the respective current coordinate values of PathFlag (i,j) and the coordinate values of the value "(0,1,0)" (step ST0222).

If the calculating unit 1500 determines that the distance d(i,j−1)+q is equal to or larger than the distance d(i,j) in step ST0220, or after carrying out the procedure of step ST0222, the calculating unit 1500 determines whether the distance d(i−1,j)+r calculated based on the mapping to delete the character string ai is smaller than the distance d(i,j) calculated in step ST0218 or ST0221 (step ST0223). If the calculating unit 1500 determines that the distance d(i−1,j)+r is smaller than the distance d(i,j), the calculating unit 1500 carries out the procedure of step ST0224. If the calculating unit 1500 determines that the distance d(i−1,j)+r is not smaller than the distance d(i,j), the calculating unit 1500 carries out the procedure of step ST0226.

If the calculating unit 1500 determines that the distance d(i−1,j)+r is smaller than the distance d(i,j) in step ST0223, the calculating unit 1500 sets the distance d(i,j) as "d(i−1,j)+r" (step ST0224).

The calculating unit 1500 then sets the variable PathFlag (i,j) as the value obtained by performing an OR operation between the respective current coordinate values of PathFlag (i,j) and the coordinate values of the value "(1,0,0)" (step ST0225).

If the calculating unit 1500 determines that the distance d(i−1,j)+r is equal to or larger than the distance d(i,j) in step ST0223, or after carrying out the procedure of step ST0225, the calculating unit 1500 increments the variable j by 1 (step ST0226). After that, the calculating unit 1500 returns to step ST0217, and repeats the above described procedures.

If the calculating unit 1500 determines that the variable j is larger than "m'" in step ST0217, the calculating unit 1500 increments the variable i by 1 (step ST0227). After that, the calculating unit 1500 returns to step ST0215, and repeats the above described procedures.

If the calculating unit 1500 determines that the variable i is larger than "n" in step ST0215, the calculating unit 1500 sets the distance between the example sentence A and the input sentence S' as Distance(A,S') having a value d(n,m') (step ST0228).

Although not shown in the flowcharts, the calculating unit 1500 outputs the calculated distance Distance(A,S') between the examples sentence pattern A and the input sentence S', the other distances d(i,j) (1<=i<=n, 1<=j<=m'), the example sentence pattern A, the translated example sentence pattern, the correspondence relationship information F2, and the input sentence S', to the extracting unit 1600. After that, the calculating unit 1500 ends the indicator calculating operation.

Referring now to Table 3, the second indicator calculated by the calculating unit 1500 is described. Table 3 shows an example of the second indicator calculated by the calculating unit 1500.

TABLE 3

| EXAMPLE SENTENCE PATTERN A | INPUT SENTENCES' | | | | |
|---|---|---|---|---|---|
| | EMPTY CHARACTER STRING | FX NO TANAKASAN | NI | KANARAZU | WATASHI-TE-KUDASAI [WATASU TE KUDASARU] |
| EMPTY CHARACTER STRING | 0(0, 0, 0) | 1(0, 1, 0) | 2(0, 1, 0) | 3(0, 1, 0) | 5(0, 1, 0) |
| KANARAZU | 1(1, 0, 0) | 1.5(0, 0, 1) | 2.5(0, 1, 1) 1' | 2(0, 0, 1) | 3(0, 1, 0) |
| V1 | 2(1, 0, 0) | 1(0, 0, 1) | 2(0, 1, 0) | 3(1, 1, 0) | 3.5(0, 0, 1) |
| WO | 3(1, 0, 0) | 2(1, 0, 0) | 2.5(0, 0, 1) | 3.5(0, 1, 1) | 4.5(0, 1, 1) |
| V2 | 4(1, 0, 0) | 3(1, 0, 0) | 3.5(0, 1, 1) | 4(0, 0, 1) | 5(0, 1, 1) |
| NI | 5(1, 0, 0) | 4(1, 0, 0) | 3(0, 0, 1) | 4(0, 1, 0) | 5(0, 1, 0) |
| WATASHI-TE-KUDASAI [WATASU TE KUDASARU] | 6(1, 0, 0) | 5(1, 0, 0) | 4(1, 0, 0) | 4.5(0, 0, 1) | 4(0, 0, 1) |

The columns in Table 3 indicates an empty character string and the character strings forming the converted input sentence S'. The rows in Table 3 indicate an empty character string and the character strings forming the example sentence pattern A.

Each element in Table 3 represents a distance that is defined by a mapping that associates the empty character string or the character string represented by the column storing the element and the empty character string or the character string(s) represented by the column(s) on the left side of the column showing the element, with the empty character string or the character string represented by the row storing the element and the empty character string or the character string(s) represented by the row(s) above the column showing the element. Each element in Table 3 also represents PathFlag.

More specifically, the element "1(0,0,1)" on the third row and the second column indicates that the value of the distance that is defined by a mapping that associates the character string "FX no Tanaka-san" on the second column and the empty character strings represented by the column on the left of the second column, with the symbol "V1" represented by the third row and the empty character string and the character string "kanarazu" represented by the rows above the third row, is "1". The element "1(0,0,1)" on the third row and the second column also indicates that the value of PathFlag(2,1) is "(0,0, 1)".

Accordingly, as the element on the seventh row and the fifth column in Table 3 indicates that the distance between the converted input sentence S' and the example sentence pattern A is calculated as "4" by the calculating unit 1500.

Referring back to FIG. 2, explanation of the structure of the translation device 1000 is resumed.

The extracting unit 1600 is connected to the calculating unit 1500 and the translating unit 1700. The extracting unit 1600 extracts an example sentence pattern under which input sentences are to be classified based on the second indicator calculated by the calculating unit 1500. The extracting unit 1600 also associates the uncommon portions of a sentence converted by the converting unit 1400 with the uncommon character strings of the extracted example sentence pattern.

Figure 17:
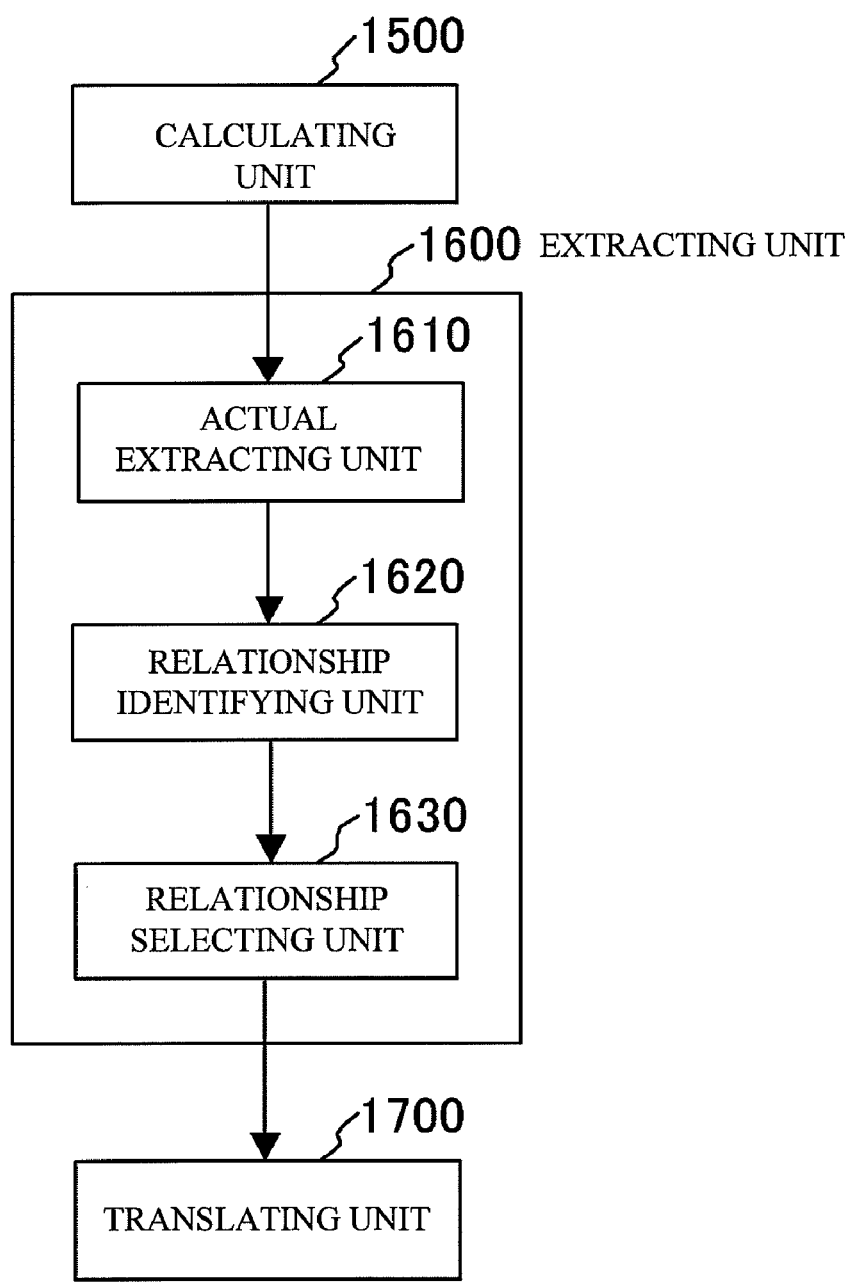
FIG. 17 is a functional block diagram showing an example structure of the extracting unit.

Referring now to FIG. 17, the structure of the extracting unit 1600 is described. FIG. 17 is a functional block diagram illustrating an example structure of the extracting unit 1600.

The extracting unit 1600 includes an actual extracting unit 1610, a relationship identifying unit 1620, and a relationship selecting unit 1630.

The actual extracting unit 1610 is connected to the calculating unit 1500 and the relationship identifying unit 1620. The actual extracting unit 1610 performs the later described actual extracting operation to extract one pattern from example sentence patterns detected by the searching unit 1300.

An example of the actual extracting operation to be performed by the actual extracting unit 1610 is now described.

First, the actual extracting unit 1610 obtains the second indicator (the distance) calculated by the calculating unit 1500. The actual extracting unit 1610 then obtains the example sentence pattern A detected by the searching unit 1300 from the calculating unit 1500.

After that, the actual extracting unit 1610 extracts an example sentence pattern having the smallest distance between the input sentence and the example sentence pattern, which is the second indicator calculated by the calculating unit 1500. The actual extracting unit 1610 then outputs the extracted example sentence pattern as the pattern that classifies input sentences to the relationship identifying unit 1620.

The actual extracting unit 1610 also obtains the PathFlag variable produced when the distance from the selected example sentence pattern is calculated, the converted input sentence S', the translated example sentence pattern associated with the extracted example sentence pattern A, and the correspondence relationship information F2, from the calculating unit 1500. The actual extracting unit 1610 then outputs obtained input sentence S', the PathFlag variable, the translated example sentence pattern, and the correspondence relationship information F2, to the relationship identifying unit 1620. After that, the actual extracting unit 1610 ends the actual extracting operation.

The relationship identifying unit 1620 is connected to the actual extracting unit 1610 and the relationship selecting unit 1630. The relationship identifying unit 1620 performs the later described relationship identifying operation to identify the correspondence relationship between the converted character strings of the input sentence S' and the character strings of the example sentence pattern A under which the input sentence S is classified.

Referring now to FIG. 18, the relationship identifying operation to be performed by the relationship identifying unit 1620 is briefly described. FIG. 18 illustrates an example of the relationship identifying operation to be performed by the relationship identifying unit 1620.

First, the relationship identifying unit 1620 obtains the element on the seventh row and the fifth column indicating the distance between the input sentence S' and the example sentence pattern A, and the value of the PathFlag variable. Since the value of the variable PathFlag(6,4) is "(0,0,1)", the relationship identifying unit 1620 determines that the distance represented by the element on the seventh row and the fifth column is defined by a mapping formed by combining a mapping that associates the character strings represented by the second through fourth columns of the input sentence S' with the character strings represented by the second through sixth rows of the example sentence pattern A, with a mapping that defines the rule to replace the character string represented by the seventh row of the example sentence pattern A with the character string represented by the fifth column of the input sentence S'.

Accordingly, the relationship identifying unit 1620 determines that the correspondence relationship between the character string a6 represented by the seventh and the character string s4 represented by the fifth column is a replacement relationship, and adds the value "(6:4)" to correspondence relationship information F1.

The relationship identifying unit 1620 then obtains the element on the sixth row and the fourth column indicating PathFlag(5,3).

After that, since the value of PathFlag(5,3) is "(0,1,0)", the relationship identifying unit 1620 determines that the distance represented by the element on the sixth row and the fourth column is defined by a mapping formed by combining a mapping that associates the character strings represented by the second and third columns of the input sentence S' with the character strings represented by the second through fifth rows of the example sentence pattern A, with a mapping that defines the rule to insert the character string represented by the fourth row of the input sentence S' to the example sentence pattern A.

Accordingly, the relationship identifying unit 1620 determines that the character string s3 represented by the fourth column is to be inserted to the example sentence pattern A, and adds the value "(0:3)" to the correspondence relationship information F1.

By repeating the above described procedures, the relationship identifying unit 1620 identifies the correspondence relationship between the character strings of the input sentence S' and the character strings of the example sentence pattern A.

The operation to be performed by the relationship identifying unit 1620 with respect to the element on the fifth row and the second column is now described as a specific example.

Since the value of PathFlag(4,1) is "(1,0,1)", the relationship identifying unit 1620 determines that the distance represented by the element on the fifth row and the second column is defined by a mapping formed by combining a mapping that associates the empty character string represented by the first column of the input sentence S' with the character strings represented by the second through fourth rows of the example sentence pattern A, with a mapping that defines the rule to replace the character string represented by the fifth row of the example sentence pattern A with the character string represented by the second column of the input sentence S' or a mapping that defines the rule to delete the character string represented by the fifth row of the example sentence pattern A.

Accordingly, if the relationship identifying unit 1620 determines that the correspondence relationship between the character string a4 represented by the fifth row and the character string s1 represented by the second column is a replacement relationship, the relationship identifying unit 1620 adds the value "(4:1)", so as to generate correspondence relationship information F11. If the relationship identifying unit 1620 determines that the character string a4 represented by the fifth row is to be deleted from the example sentence pattern A, the relationship identifying unit 1620 adds the value "(4:0)", so as to generate correspondence relationship information F12.

A set formed with one or more pieces of correspondence relationship information F1 may be referred to as correspondence relationship set SF, for example. The specifics of the correspondence relationship information F1 and F12 belonging to the correspondence relationship set SF are the same as those of the correspondence relationship information F2, and therefore, explanation of them is omitted here.

Figure 19:
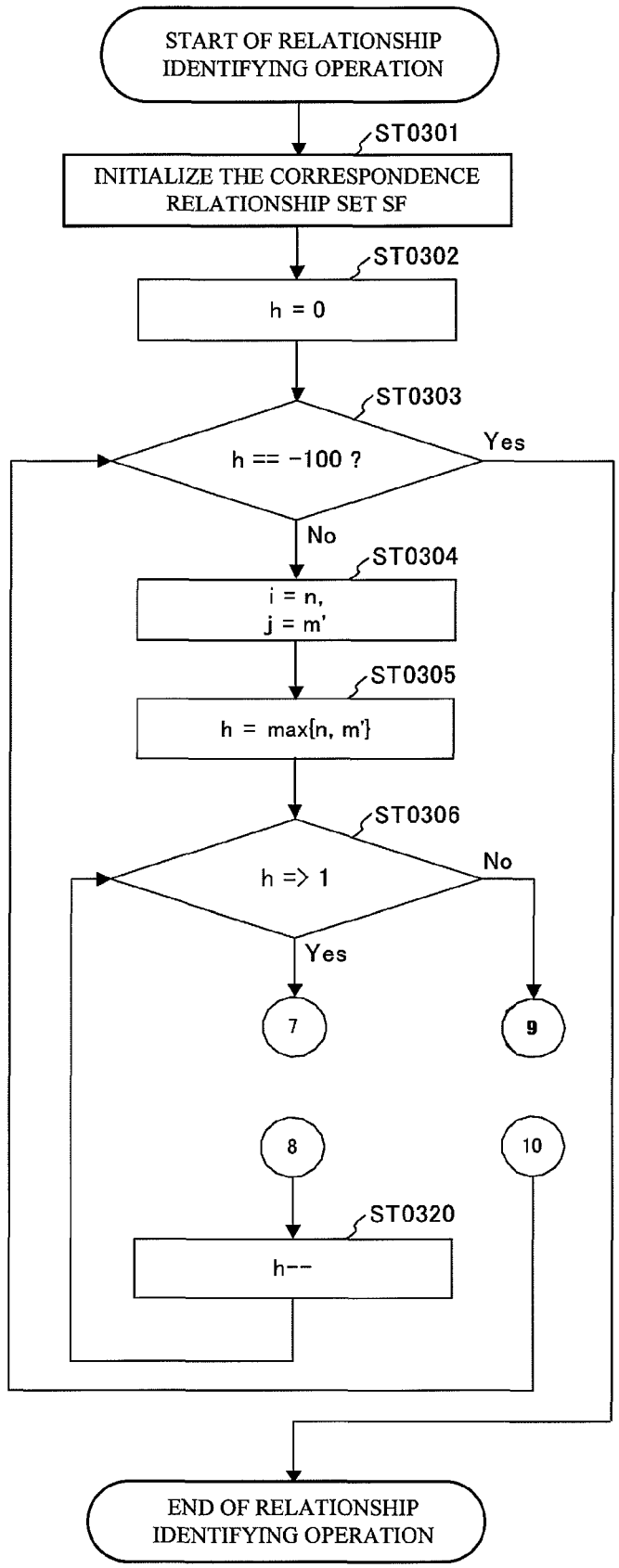
FIG. 19 is a flowchart showing a part of a relationship identifying operation to be performed by the relationship identifying unit.
Figure 20:
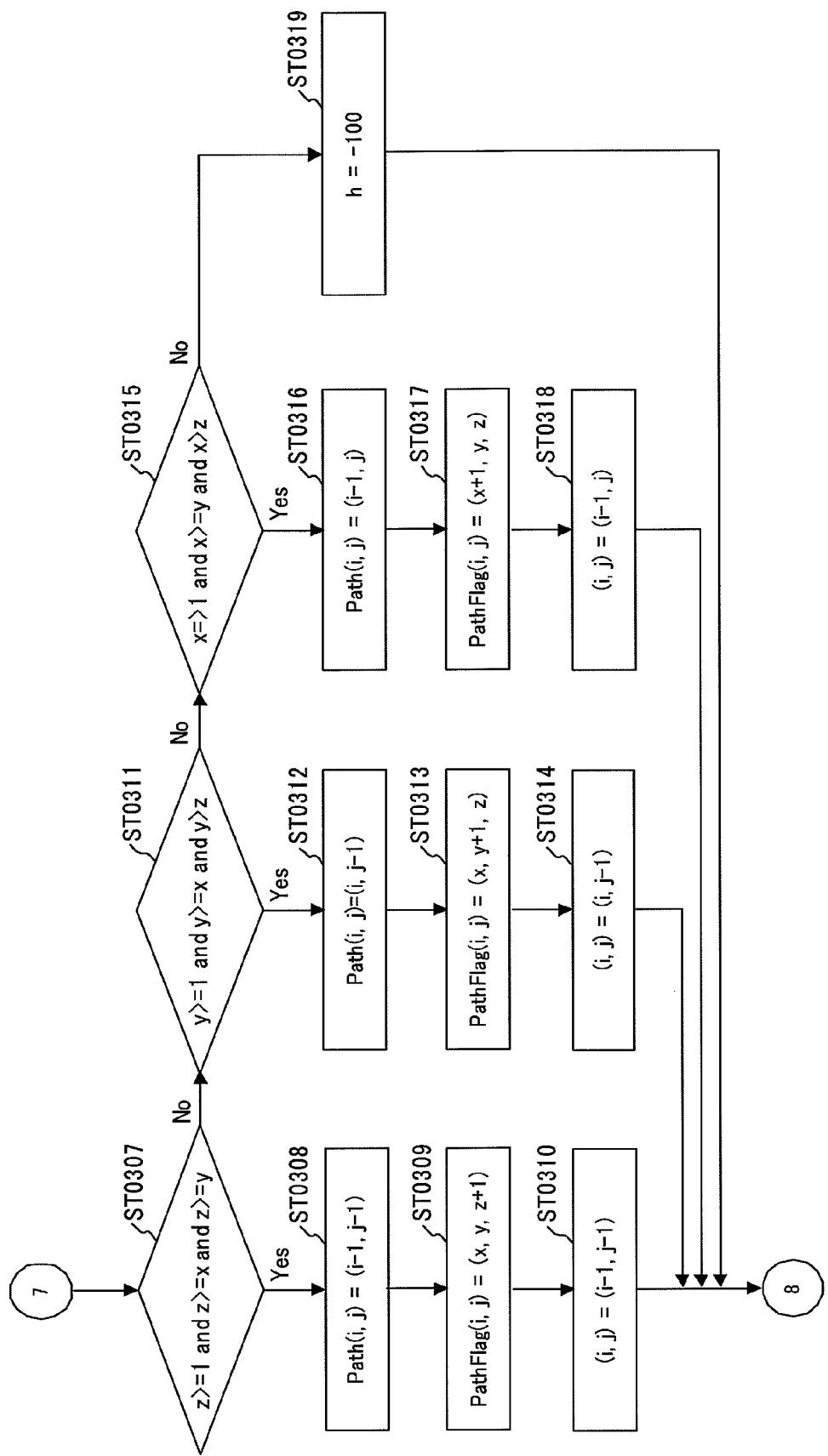
FIG. 20 is a flowchart showing another part of the relationship identifying operation to be performed by the relationship identifying unit.
Figure 21:
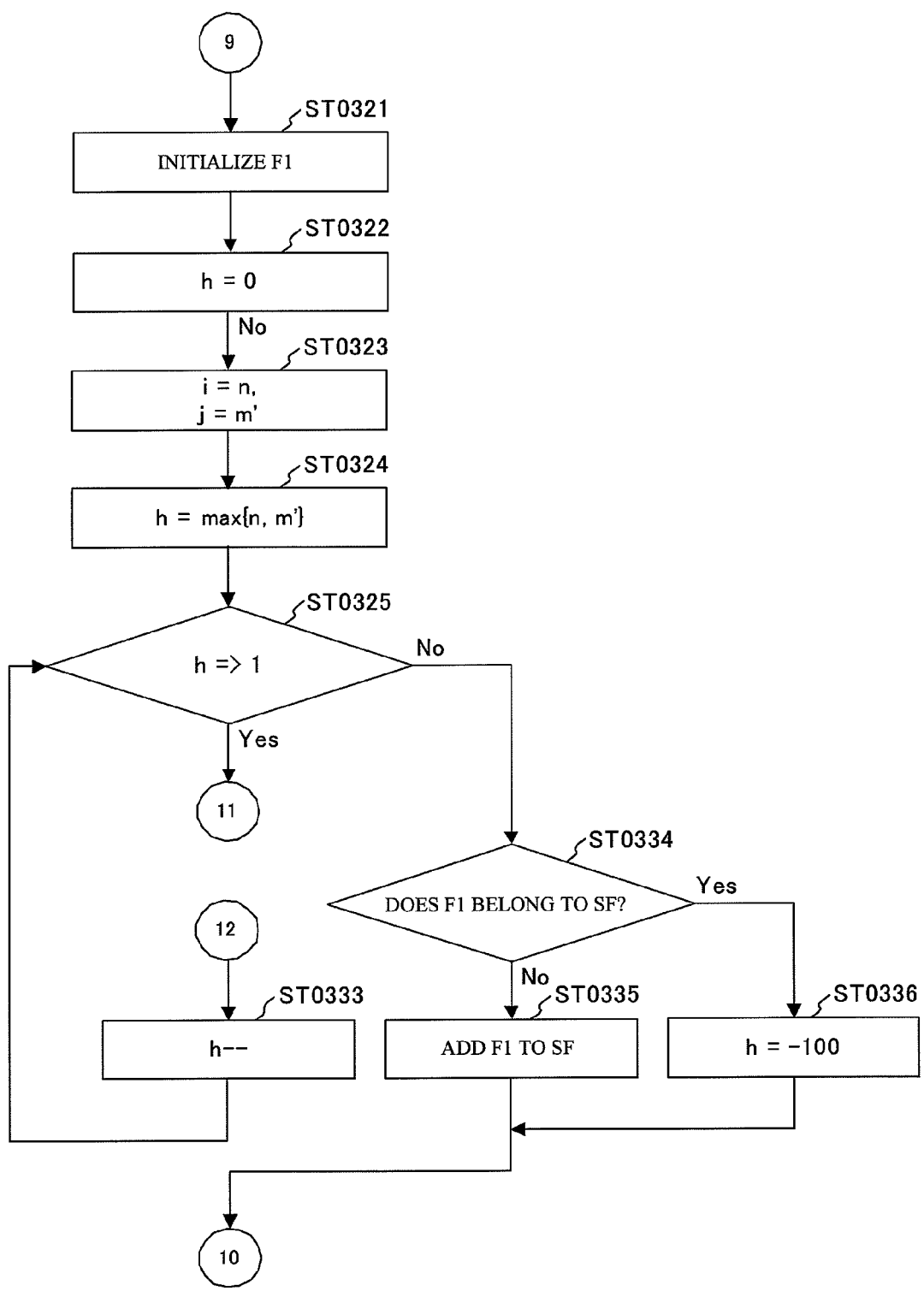
FIG. 21 is a flowchart showing yet another part of the relationship identifying operation to be performed by the relationship identifying unit.
Figure 22:
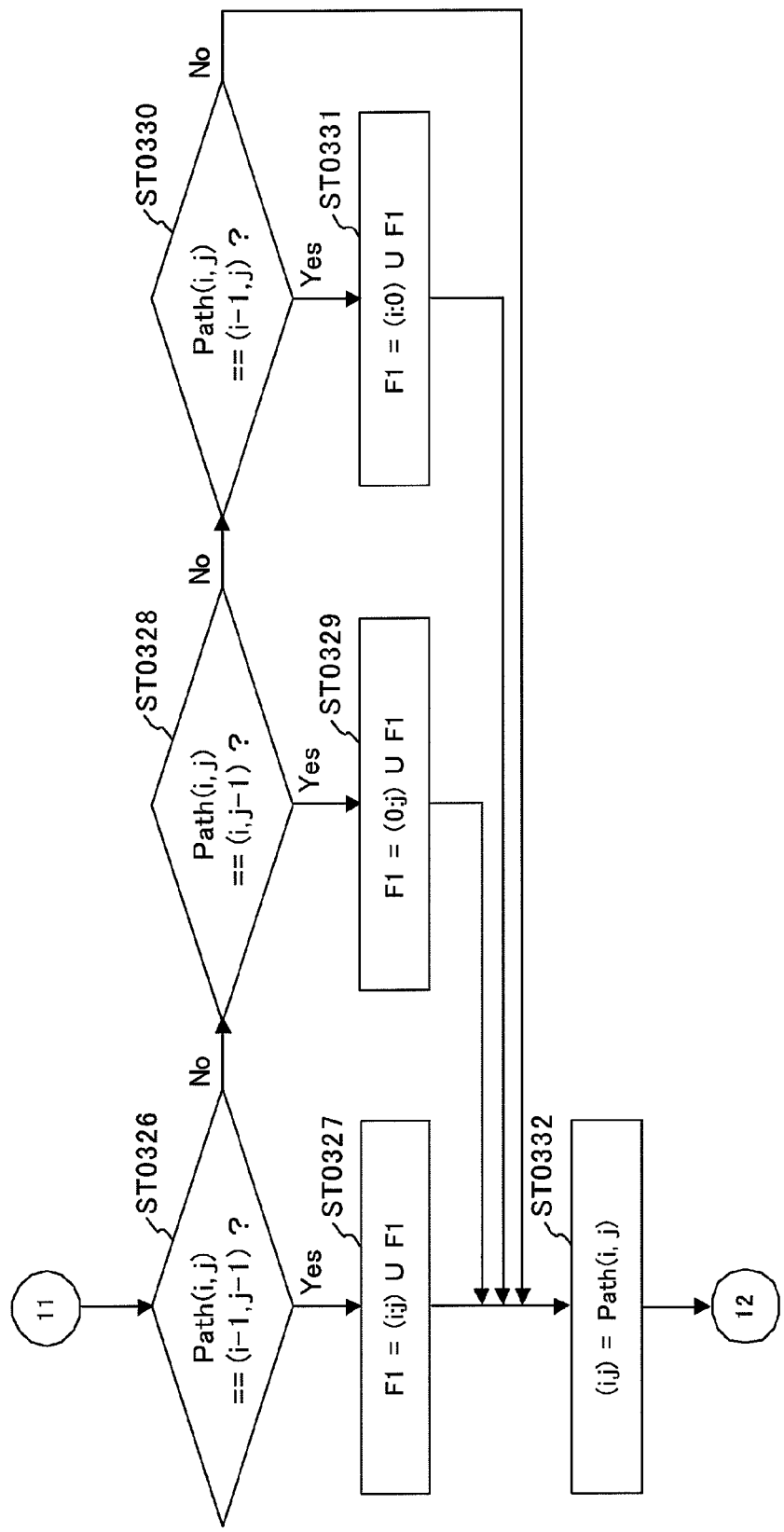
FIG. 22 is a flowchart showing the remaining part of the relationship identifying operation to be performed by the relationship identifying unit.

Referring now to FIGS. 19 through 22, the relationship identifying operation to be performed by the relationship identifying unit 1620 is described. FIG. 19 is a flowchart showing a part of an example of the relationship identifying operating to be performed by the relationship identifying unit 1620. FIGS. 20 through 22 are flowcharts showing the remaining parts of the example of the relationship identifying operation to be performed by the relationship identifying unit 1620.

First, the relationship identifying unit 1620 initializes the correspondence relationship set SF by turning the correspondence relationship set SF into an empty set (step ST0301).

The relationship identifying unit 1620 then initializes the counter variable h by assigning the value "0" to the counter variable h (step ST0302). After that, the relationship identifying unit 1620 determines whether the counter variable h is the value "−100" (step ST0303). If the counter variable h is the value "−100", the relationship identifying unit 1620 ends the relationship identifying operation. If the counter variable h is not the value "−100", the relationship identifying unit 1620 carries out the procedure of step ST0304.

If the relationship identifying unit 1620 determines that the counter variable h is not the value "−100" in step ST0303, the relationship identifying unit 1620 initializes a counter variable i by assigning the number "n" of character strings of the example sentence pattern A to the counter variable i that indicates the order in which the character strings of the example sentence pattern A are used in a sentence, and also initializes a counter j by assigning the number "m'" of character strings of the input sentence S' to the counter j that indicates the order in which the character strings of the input sentence S' are used in a sentence (step ST0304).

The relationship identifying unit 1620 then sets the variable h as the number n of character strings forming the example sentence pattern A or the number m' of character strings forming the input sentence S', whichever is larger (step ST0305).

After that, the relationship identifying unit 1620 determines whether the variable h is equal to or larger than the value "1" (step ST0306). If the relationship identifying unit 1620 determines that the variable h is equal to or larger than the value "1", the relationship identifying unit 1620 carries out the procedure of step ST0307. If the relationship identifying unit 1620 determines that the variable h is not equal to or larger than the value "1", the relationship identifying unit 1620 carries out the procedure of step ST0321.

If the relationship identifying unit 1620 determines that the variable h is equal to or larger than the value "1" in step ST0306, the relationship identifying unit 1620 determines whether the requirements that the value of the z-coordinate of PathFlag(i,j) should be equal to or larger than the value "1", should be equal to or larger than the value of the x-coordinate, and should be equal to or larger than the value of the y-coordinate (hereinafter referred to simply as the "first requirements") are satisfied (step ST0307). If the relationship identifying unit 1620 determines that the first requirements are satisfied, the relationship identifying unit 1620 carries out the procedure of step ST0308. If the relationship identifying unit 1620 determines that the first requirements are not satisfied, the relationship identifying unit 1620 carries out the procedure of step ST0311.

If the relationship identifying unit 1620 determines that the first requirements are satisfied in step ST0307, the relationship identifying unit 1620 assigns the value "(i−1,j−1)" to a variable Path(i,j) that is a two-dimensional array (step ST0308). The Path variable is a two-dimensional array indicating the correspondence relationship between character strings.

The relationship identifying unit 1620 then increments the z-coordinate of the variable PathFlag(i,j) by 1 (step ST0309). After that, the relationship identifying unit 1620 decrements the variables i and j by 1 (step ST0310). The relationship identifying unit 1620 then carries out the procedure of step ST0320.

If the relationship identifying unit 1620 determines that the first requirements are not satisfied in step ST0307, the relationship identifying unit 1620 determines whether the requirements that the value of the y-coordinate should be equal to or larger than the value "1", should be equal to or larger than the value of the x-coordinate, and should be equal to or larger than the value of the z-coordinate (hereinafter referred to simply as the "second requirements") are satisfied (step ST0311). If the relationship identifying unit 1620 determines that the second requirements are satisfied, the relationship identifying unit 1620 carries out the procedure of step ST0312. If the relationship identifying unit 1620 determines that the second requirements are not satisfied, the relationship identifying unit 1620 carries out the procedure of step ST0315.

If the relationship identifying unit 1620 determines that the second requirements are satisfied in step ST0311, the relationship identifying unit 1620 assigns the value "(i,j−1)" to the variable Path(i,j) that is a two-dimensional array (step ST0312). The value of Path(i,j) is expressed with the x-y coordinates.

The relationship identifying unit 1620 then increments the y-coordinate of the variable PathFlag(i,j) by "1" (step ST0313). After that, the relationship identifying unit 1620 decrements the variable j by 1 (step ST0314). The relationship identifying unit 1620 then carries out the procedure of step ST0320.

If the relationship identifying unit 1620 determines that the second requirements are not satisfied in step ST0311, the relationship identifying unit 1620 determines whether the requirements that the value of the x-coordinate should be equal to or larger than the value "1", should be equal to or larger than the value of the y-coordinate, and should be equal to or larger than the value of the z-coordinate (hereinafter referred to simply as the "third requirements") are satisfied (step ST0315). If the relationship identifying unit 1620 determines that the third requirements are satisfied, the relationship identifying unit 1620 carries out the procedure of step ST0316. If the relationship identifying unit 1620 determines that the third requirements are not satisfied, the relationship identifying unit 1620 carries out the procedure of step ST0319.

If the relationship identifying unit 1620 determines that the third requirements are satisfied in step ST0315, the relationship identifying unit 1620 assigns the value "(i−1,j)" to the variable Path(i,j) that is a two-dimensional array (step ST0316).

The relationship identifying unit 1620 then increments the x-coordinate of the variable Path(i,j) by "1" (step ST0317). After that, the relationship identifying unit 1620 decrements the variable i by 1 (step ST0318) The relationship identifying unit 1620 then carries out the procedure of step ST0320.

If the relationship identifying unit 1620 determines that the third requirements are not satisfied in step ST0315, the relationship identifying unit 1620 sets the value of the variable h as "−100" (step ST0319). After that, the relationship identifying unit 1620 carries out the procedure of step ST0320.

After carrying out step ST0310, step ST0314, step ST0318, or step ST0319, the relationship identifying unit 1620 decrements the variable h by 1 (step ST0320). After that, the relationship identifying unit 1620 returns to step ST0306, and repeats the above described procedures.

If the relationship identifying unit 1620 determines that the variable h is smaller than the value "1" in step ST0306, the relationship identifying unit 1620 initializes a variable F1 that stores correspondence relationship information (step ST0321). The relationship identifying unit 1620 then initializes the counter variable h by assigning the value "0" to the counter variable h (step ST0322).

The relationship identifying unit 1620 then initializes the counter variable i by assigning the number "n" of character strings of the example sentence pattern A to the counter variable i that indicates the order in which the character strings of the example sentence pattern A are used in a sentence, and also initializes the counter j by assigning the number "m'" of character strings of the input sentence S' to the counter j that indicates the order in which the character strings of the input sentence S' are used in a sentence (step ST0323).

The relationship identifying unit 1620 then sets the variable h as the number n of words and clauses forming the example sentence pattern A or the number m' of words and clauses forming the input sentence S', whichever is larger (step ST0324).

After that, the relationship identifying unit 1620 determines whether the variable h is equal to or larger than the value "1" (step ST0325). If the relationship identifying unit 1620 determines that the variable h is equal to or larger than the value "1", the relationship identifying unit 1620 carries out the procedure of step ST0326. If the relationship identifying unit 1620 determines that the variable h is not equal to or larger than the value "1", the relationship identifying unit 1620 carries out the procedure of step ST0334.

If the relationship identifying unit 1620 determines that the variable h is equal to or larger than the value "1" in step ST0325, the relationship identifying unit 1620 determines whether the value of the variable Path(i,j) is "(i−1,j−1)" (step ST0326). If the relationship identifying unit 1620 determines that the value of the variable Path(i,j) is "(i−1,j−1)", the relationship identifying unit 1620 carries out the procedure of step ST0327. If the relationship identifying unit 1620 determines that the value of the variable Path(i,j) is not "(i−1,j−1)", the relationship identifying unit 1620 carries out the procedure of step ST0328.

If the relationship identifying unit 1620 determines that the value of the variable Path(i,j) is "(i−1,j−1)" in step ST0326, the relationship identifying unit 1620 adds "(i:j)" to the correspondence relationship information F1 at the left side (the correspondence relationship information F1 will be hereinafter shown simply as "F1=(i:j) U F1") (step ST0327). After that, the relationship identifying unit 1620 carries out the procedure of step ST0332.

If the relationship identifying unit 1620 determines that the value of the variable Path(i,j) is not "(i−1,j−1)" in step ST0326, the relationship identifying unit 1620 determines whether the value of the variable Path(i,j) is "(i,j−1)" (step ST0328). If the relationship identifying unit 1620 determines that the value of the variable Path(i,j) is "(i,j−1)", the relationship identifying unit 1620 carries out the procedure of step ST0329. If the relationship identifying unit 1620 determines that the value of the variable Path(i,j) is not "(i,j−1)", the relationship identifying unit 1620 carries out the procedure of step ST0330.

If the relationship identifying unit 1620 determines that the value of the variable Path(i,j) is "(i,j−1)" in step ST0328, the relationship identifying unit 1620 adds "(0:j)" to the correspondence relationship information F1 at the left side (the correspondence relationship information F1 will be hereinafter shown simply as "F1=(0:j) U F1") (step ST0329). After that, the relationship identifying unit 1620 carries out the procedure of step ST0332.

If the relationship identifying unit 1620 determines that the value of the variable Path(i,j) is not "(i,j−1)" in step ST0328, the relationship identifying unit 1620 determines whether the value of the variable Path(i,j) is "(i−1,j)" (step ST0330). If the relationship identifying unit 1620 determines that the value of the variable Path(i,j) is "(i−1,j)", the relationship identifying unit 1620 carries out the procedure of step ST0331. If the relationship identifying unit 1620 determines that the value of the variable Path(i,j) is not "(i−1,j)", the relationship identifying unit 1620 carries out the procedure of step ST0332.

If the relationship identifying unit 1620 determines that the value of the variable Path(i,j) is "(i−1,j)" in step ST0330, the relationship identifying unit 1620 adds "(i:0)" to the correspondence relationship information F1 (the correspondence relationship information F1 will be hereinafter shown simply as "F1=(i:0) U F1") (step ST0331). After that, the relationship identifying unit 1620 carries out the procedure of step ST0332.

If the relationship identifying unit 1620 determines that the value of the variable Path(i,j) is not "(i−1,j)" in step ST0330 or after carrying out step ST0327, step ST0329, or step ST0331, the relationship identifying unit 1620 sets the value of the variable i as the value of the x-coordinate of the variable Path, and sets the value of the variable j as the value of the y-coordinate of the variable Path (step ST0332).

The relationship identifying unit 1620 then decrements the variable h by 1 (step ST0333). After that, the relationship identifying unit 1620 returns to step ST0325, and repeats the above described procedures.

If the relationship identifying unit 1620 determines that the value of the variable h is smaller than the value "1" in step ST0325, the relationship identifying unit 1620 determines whether the correspondence relationship information carried by the variable F1 belongs to the correspondence relationship set represented by the variable SF (step ST0334). If the relationship identifying unit 1620 determines that the correspondence relationship information carried by the variable F1 belongs to the correspondence relationship set represented by the variable SF, the relationship identifying unit 1620 carries out the procedure of step ST0336. If the relationship identifying unit 1620 determines that the correspondence relationship information carried by the variable F1 does not belong to the correspondence relationship set represented by the variable SF, the relationship identifying unit 1620 carries out the procedure of step ST0335.

If the relationship identifying unit 1620 determines that the correspondence relationship information carried by the variable F1 does not belong to the correspondence relationship set represented by the variable SF in step ST0334, the relationship identifying unit 1620 adds the correspondence relationship information carried by the variable F1 as an element to the correspondence relationship set represented by the variable SF (step ST0335). After that, the relationship identifying unit 1620 returns to step ST0303, and repeats the above described procedures.

If the relationship identifying unit 1620 determines that the correspondence relationship information carried by the variable F1 belongs to the correspondence relationship set represented by the variable SF in step ST0334, the relationship identifying unit 1620 sets the value of the variable h as the value "−100" (step ST0336). After that, the relationship identifying unit 1620 returns to step ST0303, and repeats the above described procedures.

Although not shown in the flowcharts, the relationship identifying unit 1620 outputs the correspondence relationship set SF that includes pieces of correspondence relationship information as elements indicating the identified correspondence relationships, to the relationship selecting unit 1630.

The relationship identifying unit 1620 also outputs the converted input sentence S', the extracted example sentence pattern A, the translated example sentence pattern, and the correspondence relationship information F2, to the relationship selecting unit 1630.

Referring back to FIG. 17, explanation of the structure of the extracting unit 1600 is resumed.

The relationship selecting unit 1630 is connected to the relationship identifying unit 1620 and the translating unit 1700. The relationship selecting unit 1630 performs the later described relationship selecting operation, to select one correspondence relationship that associates uncommon character strings and uncommon portions from the correspondence relationships identified by the relationship identifying unit 1620, based on the order in which the uncommon character strings are used in an example sentence pattern A consisting of common character strings and uncommon character strings and the order in which the uncommon portions are used in an input sentence consisting of common portions and uncommon portions.

Referring again to FIG. 18, an example of the relationship selecting operation to be performed by the relationship selecting unit 1630 is briefly described.

In a case where the example sentence pattern A is formed with fixed portions (or common character strings) and variable portions (or uncommon character strings) adjacent to one another, the relationship selecting unit 1630 selects the correspondence relationship information F1 that associates common portions and uncommon portions adjacent to one another with fixed portion and variable portions, from the elements of the correspondence relationship set (or the correspondence relationship information F11 and F12).

In this exemplary embodiment, the relationship selecting unit 1630 performs the relationship selecting operation to select one piece of correspondence relationship information F1 from the elements of the correspondence relationship set SF. However, the present invention is not limited to that. For example, priorities in rules are determined in advance, so that the rules to perform replacements come before the rules to perform deletions. In accordance with the rules with such priorities, the correspondence relationship information F1 may be selected.

In this exemplary embodiment, the example sentence pattern A is formed with fixed portions and variable portions adjacent to one another. However, the present invention is not limited to that arrangement. For example, correspondence relationship information can be selected through the same operation as above in a case where an example sentence pattern includes a fixed portion and a variable formed separated from each other by a predetermined number of characters, words, or clauses.

In the correspondence relationship (n:m) represented by the correspondence relationship information F1 identified by the relationship identifying unit 1620 performing the relationship identifying operation, at least character strings are sorted in ascending order, based on the order in which the character strings are used in the example sentence pattern A.

Figure 23:
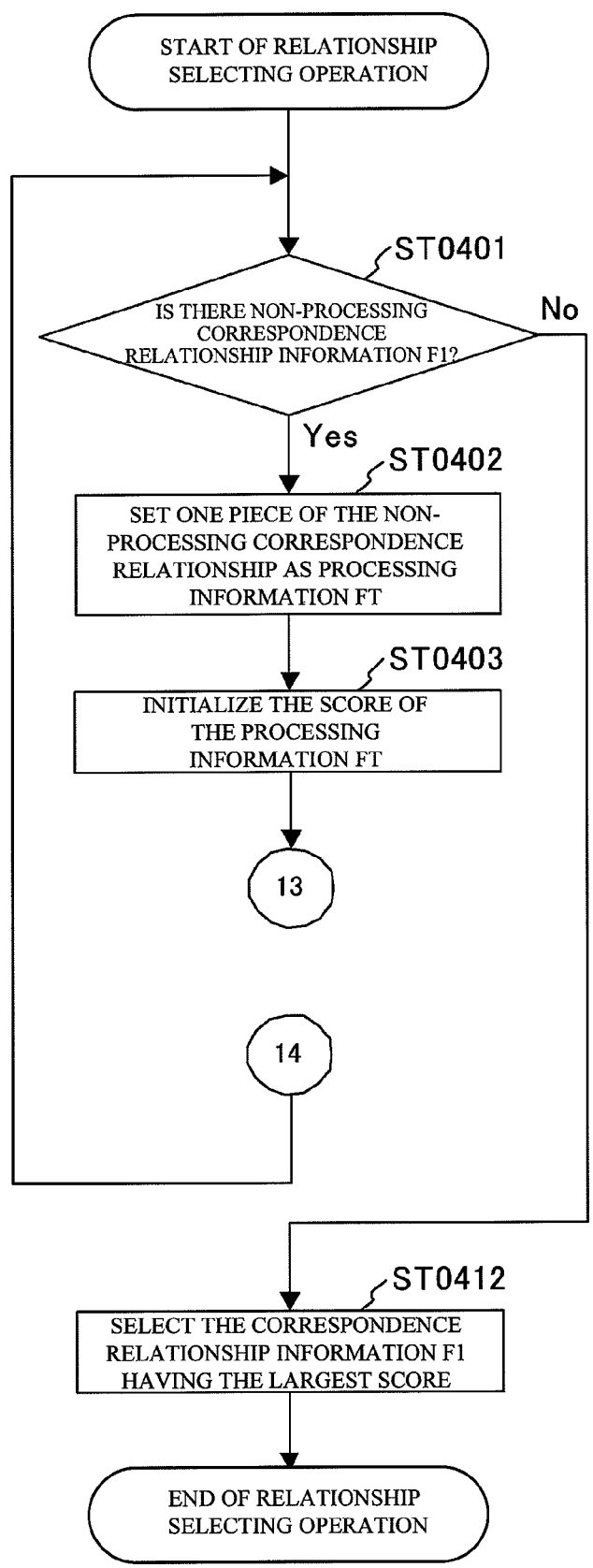
FIG. 23 is a flowchart showing a part of a relationship selecting operation to be performed by the relationship selecting unit.
Figure 24:
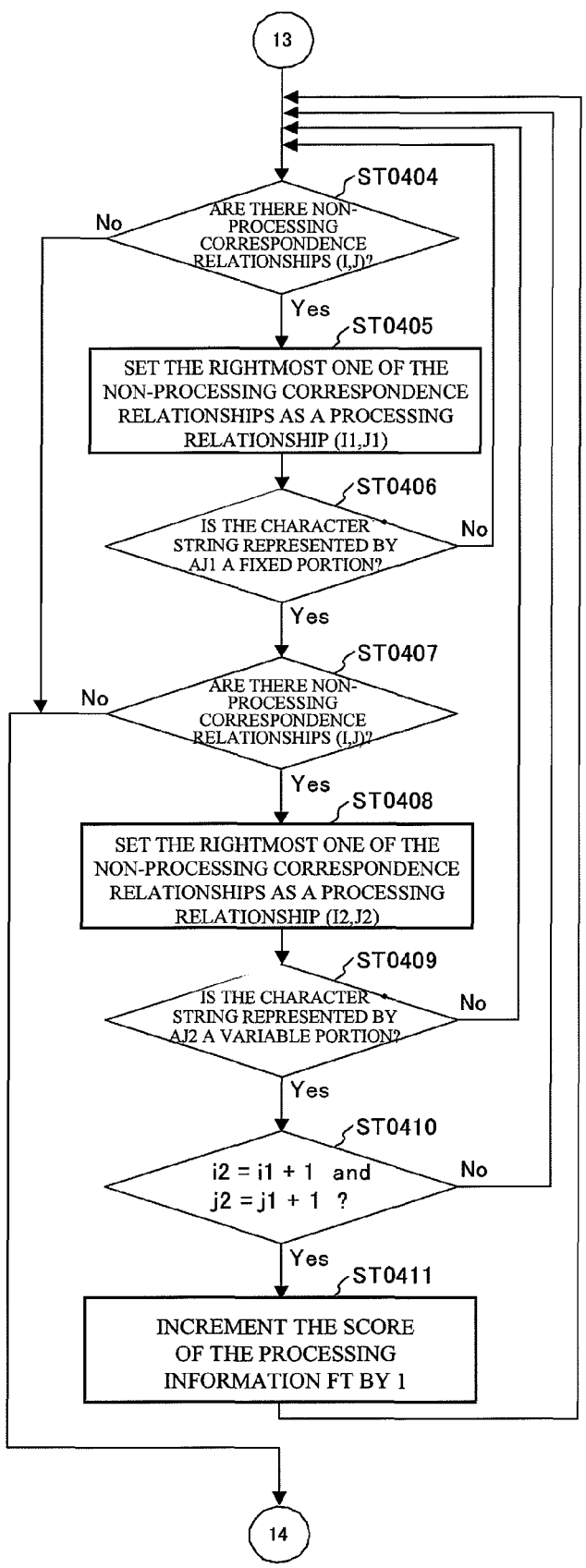
FIG. 24 is a flowchart showing the remaining part of the relationship selecting operation to be performed by the relationship selecting unit.

Referring now to FIGS. 23 and 24, the relationship selecting operation to be performed by the relationship selecting unit 1630 is described. FIG. 23 is a flowchart showing a part of an example of the relationship selecting operation to be performed by the relationship selecting unit 1630. FIG. 24 is a flowchart showing the remaining part of the example of the relationship selecting operation to be performed by the relationship selecting unit 1630.

First, the relationship selecting unit 1630 obtains the correspondence relationship set SF from the relationship identifying unit 1620, though not shown in the flowcharts. The relationship selecting unit 1630 also obtains the converted input sentence, the example sentence pattern, the translated example sentence pattern, and the correspondence relationship information F2, from the relationship identifying unit 1620.

The relationship selecting unit 1630 then determines whether correspondence relationship information F1 that is not to be subjected to any processing in steps ST0402 through ST0411 (hereinafter referred to simply as the non-processing correspondence relationship information) exists in the obtained set SF (step ST0401). If the relationship selecting unit 1630 determines that the non-processing correspondence relationship information F1 exists in the set SF, the relationship selecting unit 1630 carries out the procedure of step ST0402. If the relationship selecting unit 1630 determines that the non-processing correspondence relationship information F1 does not exist in the set SF, the relationship selecting unit 1630 carries out the procedure of step ST0412.

If the relationship selecting unit 1630 determines that the non-processing correspondence relationship information F1 exists in the set SF in step ST0401, the relationship selecting unit 1630 sets the non-processing correspondence information F1 as processing information FT (step ST0402).

The relationship selecting unit 1630 then performs initialization by setting the value "0" to the score to be allotted to the processing information FT (step ST0403).

After that, the relationship selecting unit 1630 determines whether a correspondence relationship (i,j) that is not to be subjected to the processing in steps ST0405 through ST0411 (hereinafter referred to simply as a non-processing correspondence relationship) exists in the processing information ST (step ST0404). If the relationship selecting unit 1630 determines that one or more non-processing correspondence relationships (i,j) exist in the processing information FT, the relationship selecting unit 1630 carries out the procedures of step ST0405. If the relationship selecting unit 1630 determines that a non-processing correspondence relationship (i,j) does not exist in the processing information FT, the relationship selecting unit 1630 returns to step ST0401, and repeats the above described procedures. Here, reference character "i" represents the order in which the related character strings are used in the converted input sentence S'. Reference character "j" represents the order in which the related character strings are used in the example sentence pattern A.

If the relationship selecting unit 1630 determines that non-processing correspondence relationships (i,j) exist in the processing information FT in step ST0404, the relationship selecting unit 1630 sets the rightmost one of the non-processing correspondence relationships as a processing correspondence relationship (i1,j1) (step ST0405). Here, reference character "i1" represents the order in which the related character strings indicated in the processing correspondence relationship are used in the converted input sentence S'. Reference character "j1" represents the order in which the related character strings indicated in the processing correspondence relationship are used in the example sentence pattern A.

The relationship selecting unit 1630 then determines whether a character string aj1 that is represented by reference character "j1" and is in the example sentence pattern A is a fixed portion (step ST0406). If the relationship selecting unit 1630 determines that the character string aj1 is a fixed portion, the relationship selecting unit 1630 carries out the procedure of step ST0407. If the relationship selecting unit 1630 determines that the character string aj1 is not a fixed portion, the relationship selecting unit 1630 returns to step ST404, and repeats the above described procedures.

If the relationship selecting unit 1630 determines that the character string aj1 is a fixed portion in step ST0406, the relationship selecting unit 1630 determines whether a non-processing correspondence relationship (i,j) exists (step ST0407). If the relationship selecting unit 1630 determines that a non-processing correspondence relationship (i,j) exists, the relationship selecting unit 1630 carries out the procedure of step ST0408. If the relationship selecting unit 1630 determines that a non-processing correspondence relationship (i,j) does not exist, the relationship selecting unit 1630 returns to step ST0401, and repeats the above described procedures.

If the relationship selecting unit 1630 determines that non-processing correspondence relationships (i,j) exist in step ST0407, the relationship selecting unit 1630 sets the rightmost one of the non-processing correspondence relationships as a processing correspondence relationship (i2,j2) (step ST0408). Reference characters "i2" and "j2" are the same as reference characters "i1" and "j1", and therefore explanation of them is omitted here.

The relationship selecting unit 1630 then determines whether a character string aj2 that is represented by reference character "j2" and is in the example sentence pattern A is a variable portion (step ST0409). If the relationship selecting unit 1630 determines that the character string aj2 is a variable portion, the relationship selecting unit 1630 carries out the procedure of step ST0410. If the relationship selecting unit 1630 determines that the character string aj2 is not a variable portion, the relationship selecting unit 1630 returns to step ST404, and repeats the above described procedures.

If the relationship selecting unit 1630 determines that the character string aj2 is a variable portion in step ST0409, the relationship selecting unit 1630 determines whether the requirements that the value of "i2" should be the value obtained by adding "1" to the value of "i1", and the value of "j2" should be the value obtained by adding "1" to the value of "j1" (hereinafter referred to simply as the "fourth requirements") are satisfied (step ST0410).

More specifically, the relationship selecting unit 1630 determines whether the character string that appears "j1"th in the example sentence pattern A is located on the immediate right side of the character string that appears "j2"th, and the character string that appears "i1"th in the input sentence S' is located on the immediate right side of the character string that appears "i2"th, where the character string aj1 that appears "j1"th in the example sentence pattern A is equivalent to the character string s'i1 that appears "i1"th in the input sentence S', and the character string aj2 that appears "j2"th in the example sentence pattern A is equivalent to the character string s'i2 that appears "i2"th in the input sentence S'.

If the relationship selecting unit 1630 determines that the fourth requirements are satisfied, the relationship selecting unit 1630 carries out the procedure of step ST0411. If the relationship selecting unit 1630 determines that the fourth requirements are not satisfied, the relationship selecting unit 1630 returns to step ST0404, and repeats the above described procedures.

If the relationship selecting unit 1630 determines that the fourth requirements are satisfied in step ST0410, the relationship selecting unit 1630 increments the score allotted to the processing information FT by "1" (step ST0411). After that, the relationship selecting unit 1630 returns to step ST0404, and repeats the above described procedures.

If the relationship selecting unit 1630 determines that non-processing correspondence relationship information F1 does not exist in step ST0401, the relationship selecting unit 1630 selects the correspondence relationship information F1 that has the largest score allotted thereto (step ST0412).

After that, the relationship selecting unit 1630 outputs the selected correspondence relationship information F1 to the translating unit 1700, though not shown in the flowchart. The relationship selecting unit 1630 also outputs the converted input sentence, the extracted example sentence pattern, the translated example sentence pattern, and the correspondence relationship information F2, to the translating unit 1700. The relationship selecting unit 1630 then ends the relationship selecting operation.

Referring back to FIG. 2, explanation of the structure of the translation device 1000 is resumed.

The translating unit 1700 is connected to the memory 1100, the extracting unit 1600, and the display device 2000. The translating unit 1700 performs the later described translating operation to translate an input sentence in accordance with a mapping that associates character strings including the uncommon portions of the input sentence with character strings of a translated example sentence pattern that is stored in the memory 1100 and is associated with character strings including the uncommon character strings of the example sentence pattern extracted by the extracting unit 1600.

Referring now to FIG. 25, the mapping to be used in a translating operation by the translating unit 1700 is described. FIG. 25 illustrates a mapping to be used in a translating operation by the translating unit 1700.

As shown in FIG. 25, the mapping F(S,B) to be used in a translating operation by the translating unit 1700 is a composite mapping formed by combining a mapping F1(S,A) that defines the correspondence relationship between the character strings forming the sentence S' converted from the input sentence S and the character strings forming the example sentence pattern A under which the input sentence S is classified, and a mapping F2(A,B) that defines the correspondence relationship between the character strings forming the example sentence pattern A and the character strings forming the translated example sentence pattern B translated from the example sentence pattern A. The mappings F1(S,A) and F2(A,B) define the correspondence relationships indicated by the correspondence relationship information F1 and F2, respectively.

An example of a translating operation to be performed by the translating unit 1700 is now described.

First, the translating unit 1700 obtains the converted input sentence S' and the correspondence relationship information F1 extracted by the extracting unit 1600 with respect to the example sentence pattern A, from the extracting unit 1600. The translating unit 1700 identifies the mapping F1(S,A) indicated by the obtained information.

The translating unit 1700 then obtains the example sentence pattern A stored in the memory 1100 and the correspondence relationship information F2 with respect to the translated example sentence pattern B, or obtains the information F2 from the extracting unit 1600. The translating unit 1700 identifies the mapping F2(A,B) indicated by the obtained information.

The translating unit 1700 also obtains the translated example sentence pattern associated with the example sentence pattern A from the memory 1100 or the extracting unit 1600.

After that, the translating unit 1700 combines the mapping F1(S,A) and the mapping F2(A,B), and translates the input sentence S, using the composite mapping F(S,B) and the translated example sentence pattern. The translating unit 1700 then controls the display device 2000 to display the translated sentence. After that, the translating unit 1700 ends the translating operation.

The translating unit 1700 translates the converted character strings forming the input sentence S' corresponding to the variable portions of the example sentence pattern A and the translated example sentence pattern B, using the word dictionary or the example sentence dictionary stored in the memory 1100.

Referring back to FIG. 1, explanation of the structure of the translation system 10 is now resumed.

The display device 2000 may be a CRT (Cathode Ray Tube), a liquid crystal display, or a plasma display, for example, and is connected to the translation device 1000.

Under the control of the translation device 1000, the display device 2000 displays an input sentence in the first language. The display device 2000 then displays a sentence translated by the translation device 1000.

The input device 3000 may be a keyboard, a pointing device (or mouse), or a touch panel, for example, and is connected to the translation device 1000. The input device 3000 is operated by the user of the translation device 1000, to input an input sentence in the first language.

In this exemplary embodiment, the memory 1100 is equivalent to the memory in the claims, the searching unit 1300 is equivalent to the searching unit in the claims, the converting unit 1400 is equivalent to the converting unit in the claims, the calculating unit 1500 is equivalent to the calculating unit in the claims, the extracting unit 1600 is equivalent to the classifying unit in the claims, and the translating unit 1700 is equivalent to the translating unit in the claims.

In the following, a second exemplary embodiment of the present invention is described.

Second Exemplary Embodiment

In the second exemplary embodiment, the word searching unit of the translating device searches for an example sentence pattern, using a hash function. This word searching unit differs from the word searching unit of the first exemplary embodiment that performs a search with the use of a tree having a TRIE structure.

The connections, structures, and functions of the translation device, the display device, and the input device of the translation system of the second exemplary embodiment are the same as the connections, structures, and functions of the translation device 1000, the display device 2000, and the input device 3000 of the first exemplary embodiment. Therefore, only the differences between the two exemplary embodiments will be described in the following. For ease of explanation, like reference numerals are used for like components and parts in the first and second exemplary embodiments.

An example of a word searching operation to be performed by the word searching unit 1310 in the second exemplary embodiment is now described.

First, the word searching unit 1310 obtains morphemes forming an input sentence from the analyzing unit 1200. The word searching unit 1310 then extracts the words forming the input sentence from the obtained morphemes.

After that, based on the extracted words, the word searching unit 1310 performs a hashing operation to calculate a hash value. The word searching unit 1310 then obtains the record ID of the index array 1130 that is associated with the calculated hash value and is stored in the memory 1100.

The memory 1100 stores and associates the hash value calculated by the word searching unit 1310 with the record ID for identifying the record that is an element of the index array storing the identification information about the example sentence pattern including the words, based on which the hash value is calculated.

The word searching unit 1310 then outputs the obtained record ID to the example sentence pattern searching unit 1320. The word searching unit 1310 also outputs the words and clauses obtained from the analyzing unit 1200 to the example sentence pattern searching unit 1320. After that, the word searching unit 1310 ends the word searching operation.

Figure 26:
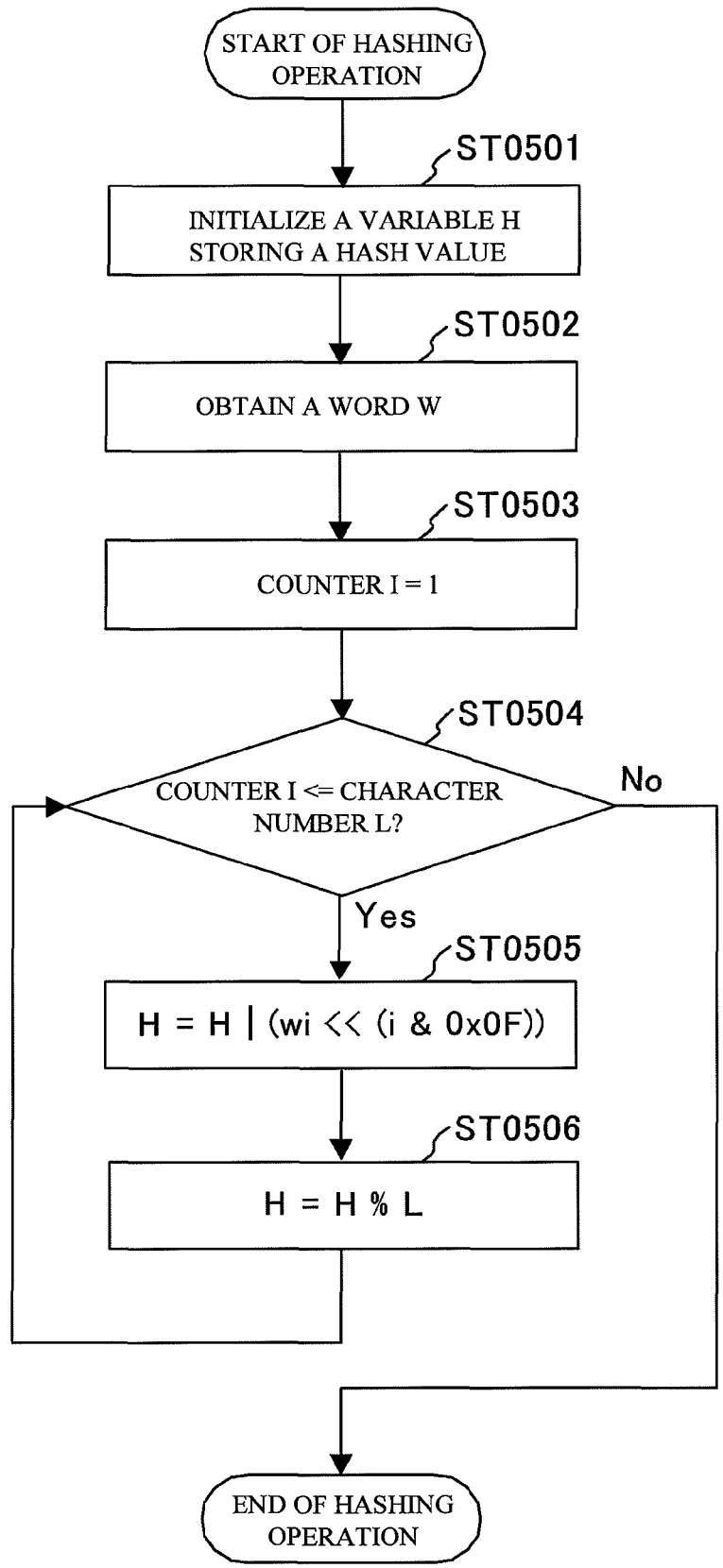
FIG. 26 is a flowchart showing a hashing operation to be performed by the word searching unit in a second exemplary embodiment of the present invention.

Referring now to FIG. 26, the hashing operation to be performed by the word searching unit 1310 in the second exemplary embodiment is described. FIG. 26 is a flowchart showing an example of the hashing operation to be performed by the word searching unit 1310 in the second exemplary embodiment.

First, the word searching unit 1310 initializes a variable H storing a hash value (step ST0501). The word searching unit 1310 then obtains a word W for which a hash value is to be calculated (step ST0502). Here, the word W is formed with characters w1 through wL.

After that, the word searching unit 1310 initializes a counter variable i by assigning the value "1" to the counter variable i (step ST0503). The word searching unit 1310 then determines whether the value of the counter variable i is equal to or smaller than the number L of characters (step ST0504). If the word searching unit 1310 determines that the value of the counter variable i is equal to or smaller than the number L of characters, the word searching unit 1310 carries out the procedure of step ST0505. If the word searching unit 1310 determines that the value of the counter variable i is not equal to or smaller than the number L of characters, the word searching unit 1310 ends the hashing operation.

If the word searching unit 1310 determines that the value of the counter variable i is equal to or smaller than the number L of characters in step ST0504, the word searching unit 1310 assigns a value obtained according to the expression "H| (wi<<(I & 0x0F))" to the variable H (step ST0505). Here, the symbols "&", "<<", and "|" represent the AND operator, the left shift operator, and the OR operator.

The word searching unit 1310 then assigns a value obtained according to the expression "H=H % L" to the variable H (step ST0506). Here, the symbol "%" represents the modulo operator. After that, the word searching unit 1310 returns to step ST0504, and repeats the above described procedures.

The translation device 1000 is realized by the operating unit 1001 executing a program that is stored in at least one of the ROM 1002, the RAM 1003, and the external memory 1004. This program may also be stored in some other type of recording medium such as a magnetic disk, an optical disk, or a semiconductor memory, and may be distributed via a network, for example.

The above described exemplary embodiment is a mere example of an exemplary embodiment of the present invention. However, the present invention is not limited to that, and various changes and modifications may be made to it without departing from the scope of the invention.

Although the external memory device is a hard disk in the above described exemplary embodiments, the present invention is not limited to that arrangement. For example, the external memory device may be a flexible disk, a CD ROM (Compact Disc Read Only Memory), a DVD-ROM (Digital Versatile Disk Read Only Memory), a DVD-RAM (Digital Versatile Disk Random Access Memory), a MO (magneto-optic (disk)), or a flash memory.

It should be noted that the present invention is not limited to those exemplary embodiments, and various modifications may be made to them without departing from the scope of the invention.

What is claimed is:

1. A translation device comprising:
    a memory that stores character strings forming an example sentence pattern under which example sentences are classified based on character strings that form the example sentences, and character strings forming a translated example sentence pattern translated from the example sentence pattern, the character strings forming the example sentence pattern being associated with the character strings forming the translated example sentence pattern based on meanings of the character strings;
    a converting unit that converts, using a first weight indicator that indicates a degree of difference in meaning between character strings forming an input sentence to be translated and character strings forming the example sentence pattern stored in the memory as a weight, the input sentence into a sentence including common portions corresponding to common character strings shared by the example sentences classified under the example sentence pattern, and uncommon portions that are not the common portions, the uncommon portions being variable portions formed by combining words of the input sentence, and the common portions being fixed words that are the same as words of the input sentence;
    a calculating unit that calculates a distance indicator that indicates a degree of difference between the input sentence and the example sentence pattern as a distance based on a rule to associate the uncommon portions of the sentence converted by the converting unit with uncommon character strings other than common character strings of the example sentence pattern, and on a second weight indicator that indicates the weight difference between the uncommon portions and the uncommon character strings;
    an extracting unit that extracts the example sentence pattern, under which the input sentence is classified, based on the distance indicator calculated by the calculating unit, and associates the uncommon portions of the sentence converted by the converting unit with the uncommon character strings of the example sentence pattern extracted by the extracting unit; and
    a translating unit that translates the input sentence based on a mapping that associates uncommon portions of the input sentence with the character strings forming the translated example sentence pattern that is stored in the memory and is associated with the uncommon character strings of the example sentence pattern extracted by the extracting unit.

2. The translation device as claimed in claim 1, wherein the calculating unit calculates the distance indicator further based on one or more of: a rule to map one or more of the common character strings and the uncommon character strings of the example sentence pattern onto one or more of the common portion and the uncommon portions of the sentence converted by the converting unit, and to replace the common character strings with the common portions in one-to-one correspondence without crisscrossing; a rule to map one or more of the common character strings and the uncommon character strings of the example sentence pattern onto one or more of the common portions and the uncommon portions of the sentence converted by the converting unit, and to replace the uncommon character strings with the uncommon portions in one-to-one correspondence without crisscrossing; a rule to map one or more of the common character strings and the uncommon character strings of the example sentence pattern onto one or more of the common portions and the uncommon portions of the sentence converted by the converting unit, and to delete one or more of the common character strings and the uncommon character strings; and a rule to map one or more of the common character strings and the uncommon character strings of the example sentence pattern onto one or more of the common portions and the uncommon portions of the sentence converted by the converting unit, and to insert one or more of the uncommon character strings and the uncommon portions.

3. The translation device as claimed in claim 1, wherein the first weight indicator indicates a higher degree of difference in a case where a character string of the input sentence is not the same as a common character string of the example sentence pattern and is not a synonym of the common character string, than in a case where the character string of the input sentence is a synonym of the common character string of the example sentence pattern.

4. The translation device as claimed in claim 1, further comprising:
    a searching unit that detects example sentence patterns that include words used in the input sentence,
    wherein the extracting unit extracts the example sentence pattern under which the input sentence is classified, from the example sentence patterns detected by the searching unit.

5. The translation device as claimed in claim 1, wherein the extracting unit associates the uncommon character strings with the uncommon portions, based on sequential order in which the common character strings and the uncommon character strings are used in the example sentence pattern, and sequential order in which the common portions and the uncommon portions are used in the input sentence.

6. The translation device of claim 1, further comprising:
    a processor which forms the example sentence pattern by classifying the character strings that form the example sentences into common character strings that are common words or clauses among the example sentences and uncommon character strings that are character strings other than the common character strings, and the processor stores the formed example sentence pattern in the memory.

7. The translation device of claim 1, wherein the processor stores, in the memory, a plurality of example sentence patterns under which example sentences are respectively classified based on character strings that form the example sentences.

8. A non-transitory computer readable medium storing a program causing a computer to execute a process for performing a translating operation, the process comprising:
    storing character strings forming an example sentence pattern under which example sentences are classified based on character strings that form the example sentences, and character strings forming a translated example sentence pattern translated from the example sentence pattern, the character strings forming the example sentence pattern being associated with the character strings forming the translated example sentence pattern based on meanings of the character strings;

converting, using a first weight indicator that indicates a degree of difference in meaning between character strings forming an input sentence to be translated and character strings forming the stored example sentence pattern as a weight, the input sentence into a sentence including common portions corresponding to common character strings shared by the example sentences classified under the example sentence pattern, and uncommon portions that are not the common portions, the uncommon portions being variable portions formed by combining words of the input sentence, and the common portions being fixed words that are the same as words of the input sentence;

calculating a distance indicator that indicates a degree of difference between the input sentence and the example sentence pattern as a distance based on a rule to associate the uncommon portions of the converted sentence with uncommon character strings other than common character strings of the example sentence pattern, and on a second weight indicator that indicates the weight difference between the uncommon portions and the uncommon character strings;

extracting the example sentence pattern, under which the input sentence is classified, based on the distance indicator, and associating the uncommon portions of the converted sentence with the uncommon character strings of the extracted example sentence pattern; and translating the input sentence based on a mapping that associates uncommon portions of the input sentence with the character strings forming the translated example sentence pattern that is stored and is associated with the uncommon character strings of the extracted example sentence pattern.

9. The non-transitory computer readable medium of claim 8, wherein the process further comprises:
   forming, prior to the storing, the example sentence pattern by classifying the character strings that form the example sentences into common character strings that are common words or clauses among the example sentences and uncommon character strings that are character strings other than the common character strings.

10. The non-transitory computer readable medium of claim 8, wherein the storing comprises storing a plurality of example sentence patterns under which example sentences are respectively classified based on character strings that form the example sentences.

11. An information processing method for performing a translating operation, the method comprising:
   storing, in a memory, character strings forming an example sentence pattern under which example sentences are classified based on character strings that form the example sentences, and character strings forming a translated example sentence pattern translated from the example sentence pattern, the character strings forming the example sentence pattern being associated with the character strings forming the translated example sentence pattern based on meanings of the character strings;

converting, using a first weight indicator that indicates a degree of difference in meaning between character strings forming an input sentence to be translated and character strings forming the example sentence pattern stored in the memory as a weight, the input sentence into a sentence including common portions corresponding to common character strings shared by the example sentences classified under the example sentence pattern, and uncommon portions that are not the common portions, the uncommon portions being variable portions formed by combining words of the input sentence, and the common portions being fixed words that are the same as words of the input sentence;

calculating a distance indicator that indicates a degree of difference between the input sentence and the example sentence pattern as a distance based on a rule to associate the uncommon portions of the converted sentence with uncommon character strings other than common character strings of the example sentence pattern, and on a second weight indicator that indicates the weight difference between the uncommon portions and the uncommon character strings;

extracting the example sentence pattern, under which the input sentence is classified, based on the distance indicator, and associating the uncommon portions of the converted sentence with the uncommon character strings of the extracted example sentence pattern; and translating, using a processor, the input sentence based on a mapping that associates uncommon portions of the input sentence with the character strings forming the translated example sentence pattern that is stored and is associated with the uncommon character strings of the extracted example sentence pattern.

12. The information processing method of claim 11, wherein the method further comprises:
   forming, prior to the storing, the example sentence pattern by classifying the character strings that form the example sentences into common character strings that are common words or clauses among the example sentences and uncommon character strings that are character strings other than the common character strings.

13. The information processing method of claim 11, wherein the storing comprises storing a plurality of example sentence patterns under which example sentences are respectively classified based on character strings that form the example sentences.

* * * * *